(12) United States Patent
Tabata

(10) Patent No.: US 8,088,007 B2
(45) Date of Patent: Jan. 3, 2012

(54) NETWORK GAME NOT REQUIRING CONTINUOUS CONNECTIVITY

(75) Inventor: Hajime Tabata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1375 days.

(21) Appl. No.: 11/212,873

(22) Filed: Aug. 29, 2005

(65) Prior Publication Data

US 2006/0046810 A1    Mar. 2, 2006

(30) Foreign Application Priority Data

Aug. 30, 2004    (JP) ............................. P2004-250855

(51) Int. Cl.
    *A63F 13/00*    (2006.01)
(52) U.S. Cl. ................. 463/42; 463/40; 463/41
(58) Field of Classification Search .......... 463/40, 463/41, 42
    See application file for complete search history.

(56) References Cited

U.S. PATENT DOCUMENTS

| | | | | |
|---|---|---|---|---|
| 2001/0008852 A1* | 7/2001 | Izumi | ............................. | 463/42 |
| 2002/0022522 A1* | 2/2002 | Yamada | ......................... | 463/42 |
| 2004/0266505 A1* | 12/2004 | Keam et al. | ...................... | 463/1 |
| 2007/0099702 A1* | 5/2007 | Tupper | ........................... | 463/42 |
| 2007/0207860 A1* | 9/2007 | Yamauchi et al. | ............. | 463/42 |

FOREIGN PATENT DOCUMENTS

| | | |
|---|---|---|
| EP | 1184061 | 3/2001 |
| EP | 1134008 | 9/2001 |
| JP | 8-332282 | 12/1996 |
| JP | 2001-104648 | 4/2001 |
| JP | 2001-204972 | 7/2001 |
| JP | 2002-369968 | 12/2002 |

OTHER PUBLICATIONS

"The Jun. 18, 2004 issue of Weekly Famitsu (Before Crisis—FFVII-)," Enterbrain Inc., Jun. 18, 2004, vol. 19, No. 25, p. 147, together with an English language translation of a relevant part thereof.
"The Aug. 13, 2004 issue of Weekly Famitsu (Before Crisis—FFVII-)," Enterbrain Inc., Aug. 13, 2004, vol. 19, No. 33, pp. 227-228, together with an English language translation of a relevant part thereof.
English Language Abstract of JP 8-332282.
English Language Abstract of JP 2001-204972 and a partial English language translation.
English Language Abstract of JP 2002-369968 and a partial English language translation.
English Language Abstract and Partial Translation of JP 2001-104648.

\* cited by examiner

*Primary Examiner* — Peter DungBa Vo
*Assistant Examiner* — Jeffrey Wong
(74) *Attorney, Agent, or Firm* — Greenblum & Bernstein, P.L.C.

(57) ABSTRACT

A cellular phone used to execute a game is connected to a server apparatus when a need arises to transmit or receive information. The game is individually progressed by each cellular phone. A user equips a player character with a material to use a magic in a battle. A party is formed by users of multiple cellular phones and a material possessed by the user belonging to the same party is registered in the server apparatus. When the user transmits a support request to the server apparatus during a battle, the server apparatus returns the support material possessed by other users belonging to the same party. The user of the cellular phone can also use a magic corresponding to the support material in the battle.

34 Claims, 9 Drawing Sheets

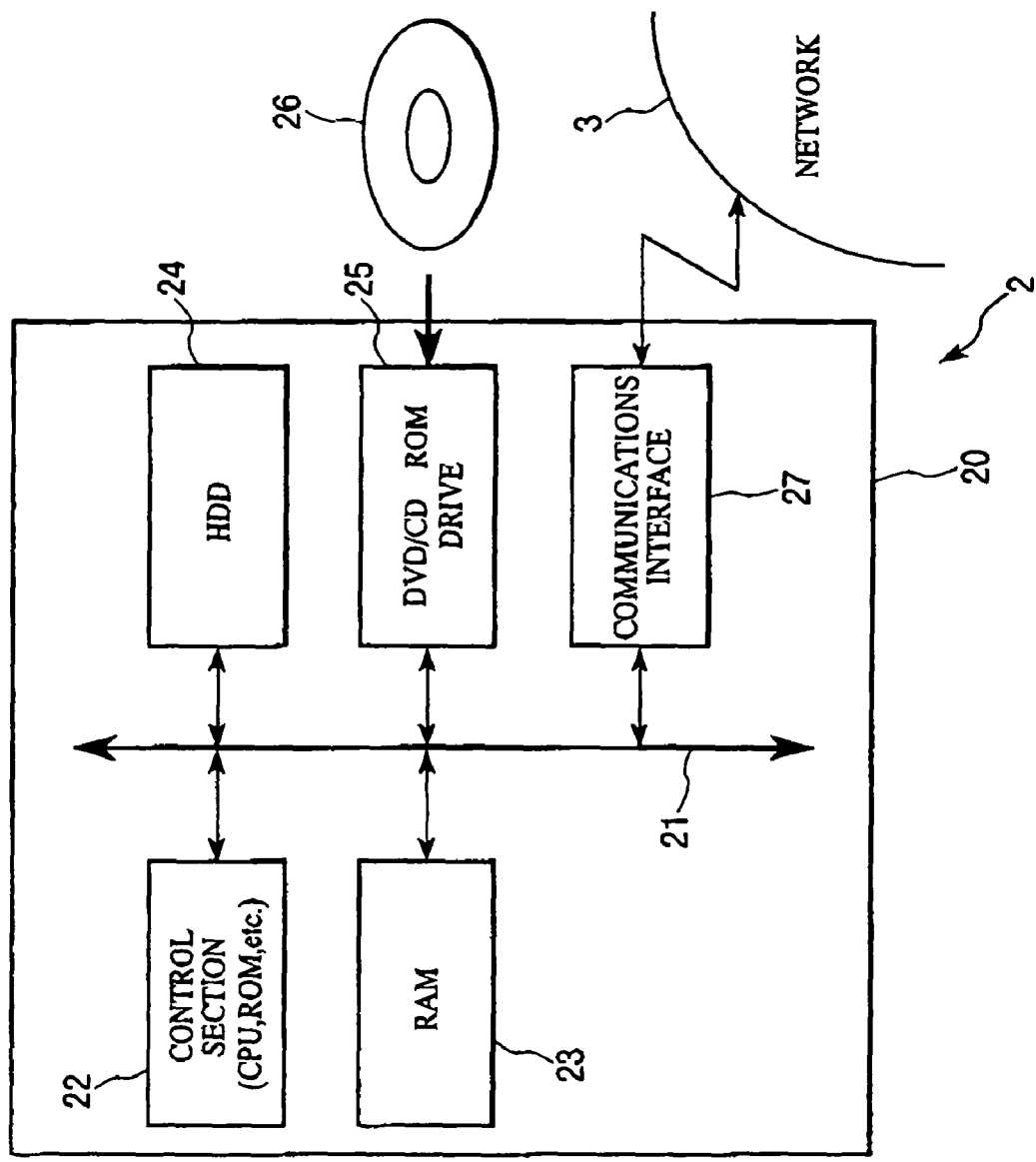

FIG.4A

| KIND OF PARAMETER | CURRENT TIME | MAX |
|---|---|---|
| HP | 149 | 227 |
| MP | 81 | 104 |
| EXPERIENCE VALUE | 759 | — |
| LEVEL | 4 | — |
| ⋮ | ⋮ | ⋮ |

| ITEM NAME | NUMBER |
|---|---|
| item A | 1 |
| item B | 2 |
| MATERIAL GEMSTONE | 1 |
| ⋮ | ⋮ |

| No. | MATERIAL NAME | ATTRIBUTE | MATERIAL EXPERIENCE VALUE | MATERIAL LEVEL | EQUIPMENT |
|---|---|---|---|---|---|
| 1 | material AA | A | 1412 | 2 | ✓ |
| 2 | material DD | D | 52 | 1 | |
| 3 | material GG | G | 6119 | 4 | ✓ |
| 4 | material BB | B | 3105 | 3 | |
| 5 | | | | | |

| PARTY | USER ID | USER NAME | MAIL ADDRESS | MATERIAL | | | | |
|---|---|---|---|---|---|---|---|---|
| | | | | 1 | 2 | 3 | 4 | 5 |
| A | 00142 | AAA | aaa@— | | | | | |
| | 03101 | AAB | aab@— | | | | | |
| | 11089 | AAC | aac@— | | | | | |
| | 21101 | AAD | aad@— | | | | | |
| B | 04150 | BBA | bba@— | | | | | |
| | 32501 | BBB | bbb@— | | | | | |
| | 00019 | BBC | bbc@— | | | | | |
| ⋮ | ⋮ | ⋮ | | | | | | |
| — | 14691 | XXX | xxx@— | | | | | |
| — | 38563 | YYY | yyy@— | | | | | |
| ⋮ | ⋮ | ⋮ | | | | | | |

200

NETWORK GAME NOT REQUIRING CONTINUOUS CONNECTIVITY

CROSS REFERENCE TO RELATED APPLICATION

The present disclosure relates to subject matter contained in Japanese Patent Application No. 2004-250855, filed on Aug. 30, 2004, the disclosure of which is expressly incorporated herein by reference in its entirety.

BACKGROUND OF THE INVENTION

1. Field of the Invention

The present invention relates to video games. More specifically, the present invention relates to a technique for pseudo-implementing functions of a network game, which progress a game when a player immediately obtains support from another player, without maintaining a continuous connection between a game apparatus and a server apparatus.

2. Description of the Related Art

A role playing game is one in which a player progresses the game by solving problems using various game items while moving a player character in a virtual space. In a role playing game, the number of methods for solving the problems during the progress of the game increases when the player uses a game item. Accordingly, the player, who performs the role playing game, has an interest in the presence or absence of the game item.

In recent years, a network game in which multiple game apparatuses are connected to a server apparatus to progress the game in cooperation with multiple players has been popular. The role playing game that is performed via the network can progress the game in cooperation with multiple players. For example, the multiple players can exchange their game items among one another. A certain player can support another player fighting in a battle.

Unexamined Japanese Patent Publication No. 2001-104648 discloses a network game in which mail is transmitted to a terminal apparatus, which is different from a game apparatus that a player operates to execute the game, thereby to send the player's instruction in the progress of the game. In addition to this network game, there is a game using mail, which is called play-by-mail. In the play-by-mail game, mail is regularly transmitted from the server apparatus to send instructions to the player. The player progresses the game based on the instructions by mail. In a game, which is called play-by-Web, instructions that are regularly sent to the player by mail based on the play-by-mail are offered on the web site.

However, in the network game, each game apparatus is always connected to the server apparatus. The server apparatus must manage the respective game apparatuses that join in the game and connect to the server apparatus. This causes a problem in which a large load is applied to both the server apparatus and the network in order to execute the network game. When the game apparatus is connected to the server apparatus via a network that charges based on an amount of information to be received and transmitted or connection time, there is a problem in which a network fee to be paid by the user of the game apparatus is too high.

The games, which are called play-by-mail and play-by-Web, are asynchronous update games. These games progress rather slowly. Accordingly, in these games, it is impossible to obtain such an immediate cooperation among the players that is realized in the network game, i.e., a case in which the player obtains support from another player as required based on the progress of the game. When a cellular phone is used as a mail terminal, the player as a receiver side can immediately receive mail sent by a transmitting side. However, the games, which are called play-by-mail and play-by-Web, do not make the best use of the immediacy of receiving and transmitting mail. Unexamined Japanese Patent Publication No. 2001-104686 does not require immediacy of the game by transmitting mail.

SUMMARY OF THE INVENTION

An object of the present invention is to provide a game system capable of implementing the same functions as those of a network game in which a player immediately obtains support from another player, without maintaining a continuous connection between a terminal and a server.

A game system according to a first aspect of the present invention includes a server and multiple terminals. Each of the terminal progresses a game with a player. Each of the terminals is intermittently connected to the server via a network for transmission and reception of information to and from the server so that the server does not control whether each terminal is in a connection state.

The terminal includes a game element obtaining section that obtains a game element that can be used by a player character during progress of the game. The terminal further includes a terminal-side game element storage that stores the obtained game element. The terminal further includes a terminal-side game element transmitter that establishes a first connection to transmit information of the obtained game element to the server via the network, and subsequently terminates the first connection. The terminal further includes a game progressing section that progresses the game using a game element selected from the stored game elements.

The game progressing section includes a terminal-side support request transmitter that establishes a second connection to transmit a support request to the server via the network in response to an instruction from a player, and subsequently terminates the second connection. The game progressing section further includes a terminal-side game element receiver that receives information of a game element transmitted from the server in response to the transmitted support request. The game progressing section further includes a support progressing section that progresses the game using the game element identified by the received information;

The server includes a server-side game element receiver that receives information of the game element transmitted from the terminal-side game element transmitter. The server further includes a server-side game element storage that stores the game element identified by the received information. The server further includes a server-side support request receiver that receives the transmitted support request. The server further includes a server-side game element transmitter that establishes a third connection to transmit information of the game element, stored in the server-side game element storage, of another player who is different from the player who originated the support request, to the terminal of the originating player in response to receiving the support request, and subsequently terminates the third connection.

In the game system according to the first aspect of the present invention, each of the terminals can individually progress the game independently of the progress of the game in another terminal. The game element obtained by each player character during the progress of the game in each terminal can be used to progress the game in the relevant terminal. The game element obtained by each player character is also stored in the server. In a terminal in which the game is progressed, the player of the terminal can request support during the progress of the game. When the support request is transmitted to the server in response to the player's instruction, information of a game element obtained by another player and stored in the server is transmitted to the terminal of the player who originated the support request. The player, who originated the support request, can use the game element identified by the received information while progressing the game.

The server and the terminal are connected to each other only when information such as the support request and game element is transmitted and received. Since the server does not have to control whether each terminal is in a connection state, it is possible to prevent an increase in processing by the server. When a player requests support, the player can use a game element of another player, receiving substantial support from the other player. Accordingly, it is possible to realize the sane functions as those of a network game that progresses the game in cooperation with multiple users, even if the respective terminals are not always connected to the server.

A game system according to a first aspect of the present invention includes a server and multiple terminals. Each of the terminals progresses a game with a player. Each of the terminals is intermittently connected to the server via a network for transmission and reception of information to and from the server so that the server does not control whether each terminal is in a connection state.

The terminal includes a game element obtaining section that obtains a game element that can be used by a player character during progress of the game. The terminal further includes a game element storage that stores the obtained game element. The terminal further includes a game progressing section that progresses the game using a game element selected from the stored game elements.

The game progressing section includes a terminal-side support request transmitter that establishes a first connection to transmit a support request to the server via the network in response to an instruction from a player, and subsequently terminates the first connection. The game progressing section further includes a terminal-side game element receiver that receives information of a support game element transmitted from the server in response to the transmitted support request. The game progressing section further includes a support progressing section that progresses the game using the game element identified by the received information.

The server includes a server-side support request receiver that receives the transmitted support request. The server further includes a support request transferring section that establishes a second connection to transfer the received support request to the terminal of the other player, who is different from the player who originated the support request, and subsequently terminates the second connection. The server further includes a server-side game element receiver that receives information of the support game element transmitted from the terminal of the other player in response to the transferred support request. The server further includes a game element transferring section that establishes a third connection to transfer information of the received support game element to the terminal of a player who originated the support request, and subsequently terminates the third connection.

The terminal of the other player includes a terminal-side support request receiver that receives the transferred support request. The terminal of the other player further includes a game element transmitter that establishes a fourth connection to transmit information of the support game element selected by the other player to the server upon receiving the support request from the server, and subsequently terminates the fourth connection.

In the game system according to the second aspect of the present invention, each of the terminals can individually progress the game independently of the progress of the game in another terminal. The game element obtained by each player character during the progress of the game in each terminal can be used to progress the game in the relevant terminal. In the terminal in which the game is being progressed, the player of the terminal can request support during the progress of the game, When the support request is transmitted to the terminal of another player via the server, information of a game element obtained by the other player is transmitted to the terminal of the player who originated the support request. The player, who originated the support request, can use the game element identified by the received information in progressing the game.

Regardless of whether the terminal is the terminal which transmitted the support request, or the terminal which received the support request, each terminal is connected to the server apparatus only when information such as the support request and the support game element is transmitted and received. Since the server does not have to control whether each terminal is in a connection state, it is possible to prevent an increase in processing by the server. When a player requests support, the player can use a game element obtained by another player, receiving substantial support from the other player. Accordingly, it is possible to realize the same functions as those of a network game that progresses the game in cooperation with the users even if the respective terminal apparatuses are not always connected to the server apparatus.

A server apparatus according to a third aspect of the present invention is intermittently connected to multiple terminals via a network for transmission and reception of information so that the server apparatus docs not control whether each terminal is in a connection state. Each of the terminals progresses a game by causing a player character to use a game element obtained by a player during the progress of the game.

The server apparatus includes a game element receiver that receives information of a game element obtained in at least one of the terminals via the network. The server apparatus further includes a game element storage that stores the game element identified by the received information. The server apparatus further includes a support request receiver that receives a support request transmitted via the network in response to a player's instruction during progress of the game from a terminal of a player who initiated the support request. The server apparatus further includes a game element transmitter that establishes a connection to transmit information of a support game element, stored in the game element storage, of another player, to the terminal of the player, who originated the support request, upon receiving the support request, and subsequently terminates the connection.

A server apparatus according to a fourth aspect of the present invention is intermittently connected to multiple terminals via a network for transmission and reception of information so that the server apparatus does not control whether each terminal is in a connection state. Each of the terminals progresses a game by causing a player character to use a game element obtained by a player during the progress of the game.

The server apparatus includes a support request receiver that receives a support request sent from one of the terminals via the network. The server apparatus further includes a support request transferring section that establishes a first connection to transfer the received support request to another terminal, which is different from the terminal which sent the support request, upon receiving the support request, and subsequently terminates the first connection. The server apparatus further includes a support game element receiver that receives information of a support game element transmitted from the other terminal in response to the transferred support request. The server apparatus further includes a game element transferring section that establishes a second connection to transfer information of the received support game element to the terminal that sent the support request, and subsequently terminates the second connection.

A game apparatus according to a fifth aspect of the present invention is intermittently connected to a server via a network for transmission and reception of information so that the server does not control whether the game apparatus is in a connection state. The game apparatus includes a game element obtaining section that obtains a game element that can be used by a player character during progress of a game. The game apparatus further includes a game element storage that stores the obtained game element. The game apparatus further includes a game progressing section that progresses the game using a game element selected from the stored game elements.

The game progressing section includes a support request transmitter that establishes a connection to transmit a support request to the server via the network in response to an instruction from a player, and subsequently terminates the connection. The game processing section further includes a game element receiver that receives information of a game element of another player transmitted from the server in response to the transmitted support request. The game processing section further includes a support progressing section that progresses the game using the game element identified by the received information.

A server apparatus according to a sixth aspect of the present invention is intermittently connected to multiple terminals via a network for transmission and reception of information so that the server apparatus does not control whether each terminal is in a connection state. Each of the terminals progresses a game by causing a player character to use a game element obtained by a player during progress of the game. The server apparatus includes a program memory that stores a program, a data memory that stores data, a processor that executes the program, and a communications device that performs communications with each terminal for transmission and reception of information.

The program causes the communications device to receive information of a game element obtained in at least one of the terminals. The program further causes the data memory to store information of the game element identified by the received information. The program further causes the communications device to receive a support request transmitted via the network in response to a player's instruction during progress of the game from a terminal of a player who initiates the support request. The program further causes the communications device to establish a connection to transmit information of the game element, stored in the data memory, of another player, to the terminal of the player who originated the support request, upon receiving the support request, and subsequently terminate the connection.

A server apparatus according to a seventh aspect of the present invention is intermittently connected to multiple terminals via a network for transmission and reception of information so that the server apparatus does not control whether each terminal is in a connection state. Each of the terminals progresses a game by causing a player character to use a game element obtained by a player during progress of the game. The server apparatus includes a program memory that stores a program, a data memory that stores data, a processor that executes the program, and a communications device that performs communications with each terminal for transmission and reception of information.

The program causes the communications device to receive a support request sent from one of the terminals via a network. The program further causes the communications device to establish a first connection to transfer the received support request to another terminal, which is different from the terminal which sent the support request, upon receiving the support request, and subsequently terminate the first connection. The program further causes the communications device to receive information of a support game element transmitted from the other terminal in response to the transferred support request. The program further causes the communications device to establish a second connection to transfer information of the received support game element to the terminal that sent the support request, and subsequently terminate the second connection.

A game apparatus according to an eighth aspect of the present invention is intermittently connected to a server via a network for transmission and reception of information so that the server does not control whether the game apparatus is in a connection state. The game apparatus includes a program memory that stores a program, a processor that executes the program, and a communications device that communicates with the server for transmission and reception of information.

The program causes the processor to obtain a game element that can be used by a player character during progress of a game. The program further causes the data memory to store the obtained game element. The program further causes the processor to progress the game using a game element selected from the game elements stored in the data memory. The program further causes the communications device to establish a connection to transmit a support request to the server via the network in response to an instruction from a player, and subsequently terminate the connection. The program further causes the communications device to receive information of a game element of another player transmitted from the server in response to the transmitted support request. The program further causes the processor to progress the game using the game element identified by the received information.

The program stored in the program memory of the server apparatus according to the sixth and seventh aspects of the present invention and/or the program stored in the program memory of the game apparatus according to the eighth aspect of the present invention can be recorded on a computer-readable storage medium. The computer-readable storage medium may be a storage medium constructed to be loaded on the computer apparatus and provided separately from the computer apparatus. The computer-readable storage medium may be a storage medium such as a fixed disk device that is included in the computer apparatus and provided together with the computer apparatus.

In the program stored in the program memory of the server apparatus according to the sixth and seventh aspects of the present invention, the data signal can be superimposed on a carrier wave from another server apparatus existing on a network and the result can be distributed via the network. The program stored in the program memory of the game apparatus according to the eighth aspect of the present invention, can be a data signal superimposed on a carrier wave from a server apparatus (the same server apparatus as that of the sixth and seventh aspects of the present invention may be used) existing on a network and the result can be distributed via the network.

In order to attain the above objects, a game progressing method according to a ninth aspect of the present invention progresses a game by a server and multiple terminals each of which progresses a game with a player. Each of the terminals is connected to the server via a network for transmission and reception of information so that the server does not control whether each terminal is in a connection state.

The method progresses the game by each of the terminals individually to obtain a game element that can be used by a player character. The method further stores the obtained game element in a memory of the terminal in which the game element was obtained. The method further establishes a first connection to transmit the obtained game element to the server from the terminal in which the game element was obtained, and subsequently terminating the first connection. The method further stores the transmitted game element in a memory of the server. The method further establishes a second connection to transmit a support request to the server from a terminal in which the game is being progressed in response to an instruction from a player of the terminal, and subsequently terminating the second connection. The method further establishes a third connection to transmit a support game element, stored in the memory of the server, of a player, who is different from the player who originated the support request, to the terminal which transmitted the support request from the server, and subsequently terminating the third connection. The method further progresses the game in each terminal using a game element selected from the game elements stored in the memory of the terminal and/or using the support game element.

In order to attain the above objects, a game progressing method according to a tenth aspect of the present invention progresses a game by a server and multiple terminals each of which progresses a game with a player. Each of the terminals is connected to the server via a network for transmission and reception of information so that the server does not control whether each terminal is in a connection state.

The method progresses the game by each of the terminals individually to obtain a game element that can be used by a player character. The method further stores the obtained game element in a memory of the terminal in which the game element was obtained. The method further establishes a first connection to transmit a support request from one of the terminals in which the game is being progressed in response to an instruction from a player of the terminal to another terminal via the server, and subsequently terminating the first connection. The method further establishes a second connection to transmit a support game element from the other terminal in response to receiving the support request to the terminal which transmitted the support request via the server, and subsequently terminating the second connection. The method further progresses the game in each terminal using a game element selected from the game elements stored in the memory of the terminal and/or using the support game element.

In the present invention, connection between the server and the terminal (or game apparatus) for transmission and reception of information means as follows. Namely, except in the case when information is being transmitted and received between the server and the terminal (or game apparatus), the server and the terminal (or game apparatus) are not logically connected to each other even if they are physically connected to each other. When some information is transmitted and received between the server and the terminal (or game apparatus), the server and the terminal (or game apparatus) are logically connected to each other. In this specification, "physically" connected is used to describe being within a coverage area and able to connect, but not being capable of transmitting or receiving data between end points, such as a server and a terminal. Only logical connections permit the actual transmission and/or reception of data between a server and a terminal. In the case of the logical connection, if information can be transmitted and received between the server and the terminal (or game apparatus) via the network, there is no need for the server and the terminal (or game apparatus) to be logically connected to each other at the same time. If there exists an intermediate network device between the server and the terminal (or game apparatus), only a logical connection between the server and the intermediate device or between the terminal and the intermediate apparatus may be established.

BRIEF DESCRIPTION OF THE DRAWINGS

FIG. 3 is a block diagram illustrating a configuration of a server apparatus of FIG. 1;

FIG. 4A is a view illustrating a parameter table stored in the cellular phone of FIG. 2;

FIG. 4B is a view illustrating a possessed item table;

FIG. 4C is a view illustrating a possessed material table;

FIG. 5 is a view illustrating a user information table stored in the server apparatus of FIG. 3;

DETAILED DESCRIPTION OF PREFERRED EMBODIMENT

Embodiments of the present invention will be specifically described with reference to the attached drawings.

Figure 1:
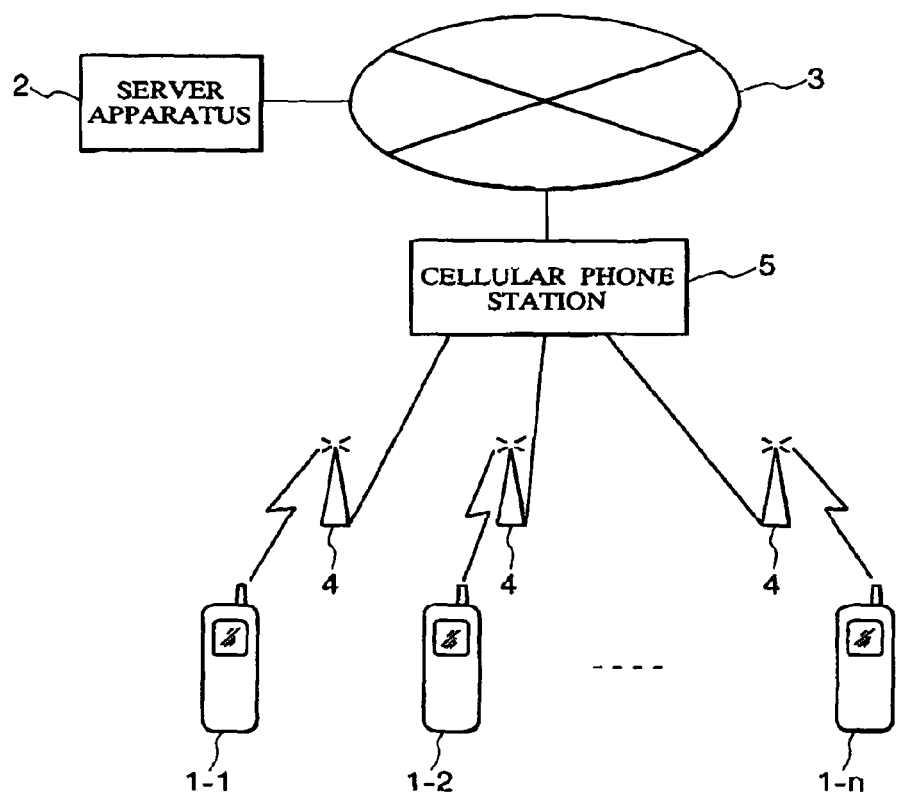
FIG. 1 is a block diagram illustrating a pseudo-network game system according to an embodiment of the present invention.

FIG. 1 is a view illustrating a configuration of a network system applied to a pseudo-network game system according to an embodiment of the present invention. As illustrated in the figure, the network system includes a sever apparatus 2 and multiple cellular phones (1-1 to 1-n) connected to the server apparatus 2 via base stations 4 (4-1 to 4-n), a cellular phone station 5, and a network (Internet herein) 3. The cellular phone station 5 and each base station 4 are connected to each other by a dedicated line and not only a physical connection but also a logical connection is always established therebetween. Whenever the server apparatus 2 and the cellular phone station 5 transmit and receive information to and from each other via the network 3, a logical connection is established between the cellular phone station 5 and the server apparatus 2.

The cellular phone 1 performs signal exchange with the base station 4 (4-1 to 4-n) in constant radio communications and they are always connected to each other from a physical point of view. However, the cellular phone 1 can neither transmit to nor receive from the base station 4 simply by performing signal exchange therewith. In order to perform transmission and reception of information therebetween, a data link between the cellular phone 1 and the base station 4 must be established. The data link can be established based on both a request from the cellular phone 1 and a request from the base station 4. In a state that the data link between the cellular phone 1 and the base station 4 is not established, the cellular phone 1 can neither transmit nor receive information to and from the server apparatus 2. The cellular phone 1 and the server apparatus 2 are logically connected to each other by establishing the data link between the cellular phone 1 and the base station 4.

The cellular phone 1 executes a game application program. A "user" as used in the following explanation refers to a person, who has registered in the server apparatus 2 to execute a game using the cellular phone 1 regardless of whether the game is being executed at a given time, if not otherwise specified. A "player" as used in the following explanation indicates a user, who is executing the game using the cellular phone 1 at a given time, if not otherwise specified. The game that is executed by the cellular phone 1 progresses independently of a game that is executed by another cellular phone except in a case of material support to be described later. The server apparatus 2 not only manages data necessary for material support but also transmits and receives information to and from the cellular phone 1 in providing the material support.

The game that is executed by the cellular phone 1 progresses by moving a player character in a virtual space according to an instruction from the player. The player character obtains a material gemstone at a predetermined point in the virtual space and generates a material from the material gemstone according to the player's instruction. In one embodiment, the player character can possess five materials at most. The materials, each having one of multiple types of attributes, are generated from the material gemstone. In this embodiment, the player character can equip himself/herself with up to two materials selected by the player from the materials possessed by himself/herself. The material with which the player character is equipped affects the progress of the game. The materials that the player character merely possesses do not affect the progress of the game.

When the player character is moved to a predetermined point in the virtual space, a battle with an enemy character is started. In the battle, the player character can attack the enemy character and defend against an attack from the enemy character using a magic type according to the attribute of the material with which the player character is equipped. The player character can also attack the enemy character and defend against the attack from the enemy character using a magic type according to the attribute of support material provided by another user belonging to the same party. The party is formed by the material support to be described later.

Figure 2:
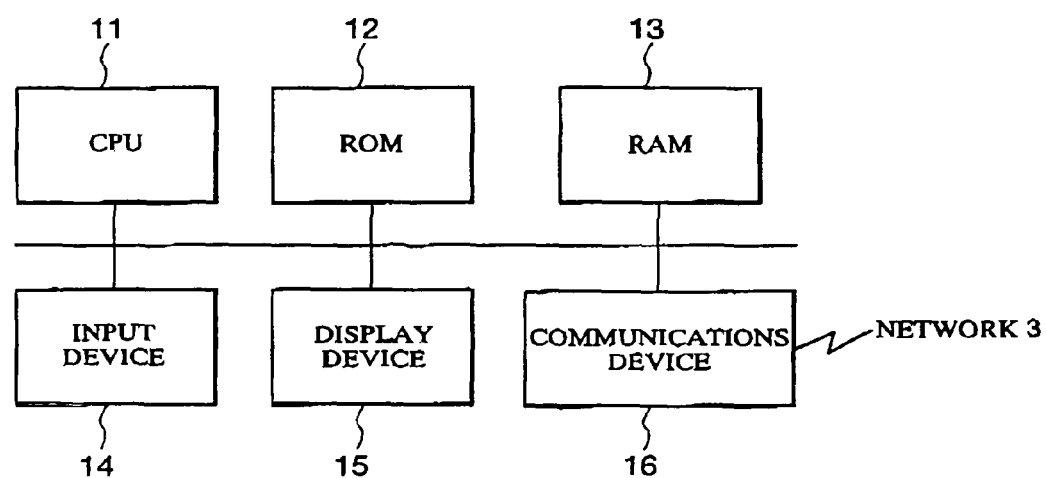
FIG. 2 is a block diagram illustrating a configuration of a cellular phone of FIG. 1.

FIG. 2 is a block diagram illustrating an exemplary configuration of one of the cellular phones 1 of FIG. 1. As illustrated in the figure, the cellular phone 1 includes a CPU (Central Processing Unit) 11, a ROM (Read Only Memory) 12, a RAM (Random Access Memory) 13, an input device 14, a display device 15, and a communications device 16. The cellular phone 1 includes other configuration elements necessary for calling, but they are not directly related to the present invention and are omitted in FIG. 2.

The CPU 11 executes a program stored in the ROM 12 and performs processing necessary for game progress. The CPU 11 includes an internal timer. The ROM 12 stores a program processed by the CPU 11 including a game application program. The ROM 12 at least partially includes an electrically writable/erasable flash memory. The game application program (including fixed data to be used in the program) is downloaded from the server apparatus 2 and stored in the flash memory that configures the ROM 12. The RAM 13 stores various kinds of data 10 be described later and is used as a work area for the CPU 11. The RAM 13 is battery backed up and storage contents are held therein even if the power of the cellular phone 1 is OFF.

The input device 14 can include numeral keys "1" to "0", a "*" key, a "#" key, and directional keys. The input device 14 inputs information necessary for a user operation into the CPU 11. The player operates the directional keys to move the player character in advancing the game. The player operates the input device 14 to select a command for an operation of the player character. The display device 15 includes a liquid crystal display device and the like and displays a screen of a game that is being executed. The communications device 16 transmits and receives information to and from the server apparatus 2 via the network 3.

The cellular phone 1 is connected to the server apparatus 2 when required to transmit and receive information. More detailed explanation is given as follows. The communications device 16 constantly performs signal exchange with the nearby base station 4. This signal exchange is simply used to transmit the position of the cellular phone 1 to a cellular phone station 5. Neither transmission of user recognizable information to the cellular phone 1 nor transmission of user desirable information from the cellular phone 1 is allowed by the signal exchange with the base station 4. When there is no need to transmit and receive information to and from the server apparatus 2, the cellular phone 1 merely performs data exchange with the nearby base station 4.

When a need arises to transmit information to the server apparatus 2 from the cellular phone 1, an instruction is sent to the base station 4 using a signal transmitted from the cellular phone 1, so that a data link between the cellular phone 1 and the base station 4 is established. When the data link between the cellular phone 1 and the base station 4 is established, a packet that configures information to be transmitted to the server apparatus 2 is sent to the base station 4. When all packets that form information to be transmitted to the server apparatus 2 are sent, the cellular phone 1 disconnects the data link with the base station 4. The packet sent from the cellular phone 1 is transmitted to the server apparatus 2 via the cellular phone station 5 and the network 3 from the base station 4 that received the packet. The data link between the cellular phone 1 and the base station 4 is thus established, so that the cellular phone 1 is logically connected to the server apparatus 2.

When a need arises to transmit information to the cellular phone 1 from the server apparatus 2, e.g., transmission of mail using an address of the cellular phone 1 as a destination, the server apparatus 2 transmits the packet that configures information to be transmitted to the cellular phone 1. The packet transmitted from the server apparatus 2 is routed via the network 3 to the base station 4 that performs signal exchange with the cellular phone 1 via the cellular phone station 5. At this point, an instruction is sent to the cellular phone 1 using a signal transmitted from the base station 4 so that a data link is established between the base station 4 and the cellular phone 1. When the data link is established, all packets transmitted from the server apparatus 2 are sent to the cellular phone 1 from the base station 4. When all packets are sent to the cellular phone 1, the base station 4 disconnects the data link with the cellular phone 1. The data link is thus established between the base station 4 and the cellular phone 1, so that the server apparatus 2 is logically connected to the cellular phone 1.

In one embodiment, the state that the cellular phone 1 and the sever apparatus 2 are connected to each other indicates as follows. The data link between the cellular phone 1 and the nearby base station 4 is established, thereby allowing information to be transmitted from the cellular phone 1 to the server apparatus 2 or allowing the cellular phone 1 to receive information from the server apparatus 2. Establishment of the data link between the cellular phone 1 and the base station 4 is not limited to a case where information is transmitted and received between the cellular phone 1 and the server apparatus 2.

FIG. 3 is a block diagram illustrating an exemplary configuration of the server apparatus 2. As illustrated in the figure, the server apparatus 2 is mainly constructed to include a server main body 20. The server main body 20 includes a control section 22, a RAM 23, a hard disk drive (HDD) 24, a DVD/CD-ROM drive 25, and a communications interface 27. The control section 22, the RAM 23, the HDD 24, the DVD/CD-ROM drive 25, and the communications interface 27 are connected to an internal bus 21. A storage medium (DVD-ROM or CD-ROM) 26 can be attached to the DVD/CD-ROM drive 25.

The control section 22 includes a CPU (Central Processing Unit), a ROM (Read Only Memory), etc., and executes a program stored on the HDD 24 or the storage medium 26 to control the server main body 20. The control section 22 also includes a time measuring function using an internal timer. The RAM 23 is a work area for the control section 22. The HDD 24 is a storage area for storing a program and data. The communications interface 27 is connected to the network 3 to transmit and receive information to and from the cellular phone 1.

The program and data for performing the game by the sever apparatus 2 are first stored on, for example, the storage medium 26. The program and data are read by the DVD/CD-ROM drive 25 and loaded onto the RAM 23 at the time of execution. The control section 22 processes the program and data loaded onto the RAM 23, transmits and receives information to and from the cellular phone 1, and sends mail to the network 3 using the address of the cellular phone 1 as a destination. Intermediate data is stored in the RAM 23 while the control section 22 performs processing.

The application program for executing the game by the cellular phone 1 is stored in the HDD 24. When receiving an application download request from the cellular phone 1, the control section 22 converts data of the application program of the game stored in the HDD 24 to a signal, superimposes the signal on a carrier wave, and sends the signal to the requesting cellular phone 1 via the network 3.

An explanation will be next given of data that the player, who is playing the game by the cellular phone 1, needs to obtain material support from another player to progress the game as required. Although various data is required to progress the game, the following will explain data necessary when the player obtains the material support from another user.

FIG. 4A is a view illustrating an exemplary parameter table stored in the RAM 13 of the cellular phone 1. A parameter table 101 is a table in which a current value and a MAX value (currently settable maximum value) are stored for each kind of parameter assigned to the player character. The MAX value may be varied. There are some parameters having values that are not limited. A MAX value is not registered for these parameters. In one embodiment, the player character has at least four parameter types including an HP (Hit Point), an MP (Magic Point), an experience value, and a level.

The HP is a parameter indicating a physical value of the player character. When the player character receives an attack from an enemy character in a battle, the HP value is decreased according to damage due to the received attack. The HP value is increased by a recovery magic, which is cast using a material with a specific attribute, and the use of a recovery item. When the HP value reaches zero, the player character is in a battle unable status. The MAX value can be set according to the level of the player character.

The MP is a parameter indicating a magic ability value of the player character. The MP value is decreased according to magic cast using a material. The MP value is increased by use of an MP recovery item. In order to cast magic or summon an avatar to be described later, an MP value, which complies with a kind of the magic to be cast or the avatar to be summoned, is required. The MAX value of MP can be set according to the level of the player character.

The experience value is a parameter indicating a degree of a player character's experience in the game. The experience value is increased when an event such as a battle is cleared. The level is an ability value indicating a rank given to the player character. The level is increased every time the experience value reaches a predetermined value. The experience value and the level are not reduced. Typically, a MAX value is not set for the experience value and the level.

The enemy character appearing in the battle has also HP and MP parameters, similar to the player character. The HP of the enemy character is one that is subtracted according to damage due to an attack received from the player character, and the MP of the enemy character is one that is subtracted according to the magic cast by the enemy character. The enemy character is also in a battle unable status when the HP value reaches zero. The player character wins a battle when the HPs of all enemy characters, who joined in the battle, reach zero before his/her own HP reaches zero.

FIG. 4B is a view illustrating a possessed item table stored in the RAM 13 of the cellular phone 1. A possessed item table 102 is a table in which items possessed by the player character at a present time and the number of respective items are registered. The player character is moved to a predetermined point on a map to obtain an item set to the point.

The items that the player character can possess include one that is used to attack the enemy character in the battle, one (such as an item for recovering HP, an item for recovering MP, etc.) that is used to defend an attack from the enemy character, and one that is used to obtain information useful for the progress of the game. As the items that the player character can possess, there is a material gemstone for generating a material used when the player character casts a magic spell.

If the player character possesses the material gemstone, the player can generate a material by a predetermined method with an arbitrary timing when it is being moved on the map. Also, when a user of the cellular phone 1 receives a material support request from another player, the user can generate a material on a condition that he/she possesses the material gemstone. The material generated from the material gemstone is registered in a possessed material table.

FIG. 4C is a view illustrating the possessed material table stored in the RAM 13 of the cellular phone 1. A possessed material table 103 is a table in which materials possessed by the player character at a present time and information of each material are registered. In this example, the player character can possess five materials No. 1 to No. 5 at the maximum and equip himself/herself with up to two materials among them. The player character can cast a magic spell according to the equipped material.

In the possessed material table, a material name, a material attribute, a material experience value, a material level, and an equipment flag are stored to be associated with the materials No. 1 to No. 5, respectively. Each attribute is one that is set to the material selected from multiple kinds of attributes. The kind of magic, which the player character can cast, varies depending on the attribute of the equipped material.

The material experience value is one that is set separately from the experience value of the player character and indicates a degree of the experience of the material. The material experience value is increased when the equipped player character wins the battle. The material experience value is also increased by providing material support in response to a support request from another player. Even when the player character wins the battle, the material experience value is not increased as long as the player simply possesses the material. The material level indicates an ability value of the material that is ranked every time when the material experience value reaches a predetermined value. If the same kind of material is used, the higher the material level, the higher the effect of the magic.

FIG. 5 is a view illustrating a user information table stored in the HDD 24 (or RAM 23) of the server apparatus 2. A user information table 200 is a table in which a user ID of a user, who joins a party, a user name, a mail address of the user, and possessed materials of the user are registered to be associated with one another for each party composed of the users of the cellular phones 1. Each party is composed of four users at the maximum, in one embodiment. Each user does not belong to any party at a game starting time. Each user provides material support to another player in response to a direct support request to be described later, resulting in belonging to the same party as the player, who received the material support.

The user ID is identification information that uniquely identifies each user. The user name is a handle name for a user. Each user can register an arbitrary user name on a condition that the user name is not the same as a user name for another user. Each user can be specified by the user ID or the user name. The mail address is used to transmit a support request mail or result mail (to be described later) to each user.

When a new material is generated by the user, generated material information including the newly generated material and already generated materials is sent from the cellular phone 1. Possessed materials of each user are registered in the user information table 200 based on the generated material information. The contents of the possessed materials registered in the user information table 200 are the same as those of the possessed material table 103 when the material is newly generated, except, no equipment flag is provided.

An explanation will be next given of the material support. In a battle between a player character and an enemy character, the player can select material support as an action of a player character who is ready to act. When selecting material support as an action of the player character, the player further designates an attribute of a requested support material. A support request indicating the designated attribute is transmitted to the server apparatus 2 from the player's cellular phone 1 via the network 3.

When receiving the support request from the cellular phone 1, the server apparatus 2 searches for a material having the same attribute as the requested attribute from the materials registered in the user information table 200 in connection with other users belonging to the same party as the requesting player. When a material having the same attribute as the requested attribute is found, the server apparatus 2 sends support material information indicating the found material to the requesting cellular phone 1. When no material having the same attribute as the requested attribute is found, the server apparatus 2 sends support material information indicating the absence of support material to the requesting cellular phone 1.

The player of the cellular phone 1, who received support material information, can then select whether direct support is sent to another user. When a direct support request is selected, the direct support request is transmitted to the server apparatus 2 from the cellular phone 1 of the player via the network 3. When receiving the direct support request from the cellular phone 1, the server apparatus 2 transmits a support request mail to cellular phones 1 of other users belonging to the same party as the requesting player. In the case where the number of other users belonging to the same party is less than three, the server apparatus 2 selects users to fill the shortage from a pool of users who do not belong to any party. The server apparatus 2 also transmits the support request mail to the cellular phone 1 of the selected user.

The user of the cellular phone 1, who received the support request mail, can select a support material to be provided to the requesting player from the materials registered in the possessed material table 103. Support information including the selected material is then sent to the server apparatus 2. The user can generate a new material from the material gemstone before selecting the support material to be provided to the player, The newly generated material can also be selected as a material to be provided to the player. Upon receiving the support information within a predetermined period of time from the direct support request, the server apparatus 2 transmits the support information to the requesting cellular phone 1. If the user of the cellular phone 1, who transmitted the support information, does not belong to any party, the user becomes a member of the same party as the requesting player.

The player can cast a magic spell on the player character in the battle using the material provided by another user in response to the support request or direct support request. In one embodiment, when four materials, three of which are provided by other users and one of which is possessed by the player himself/herself, having the same attribute are prepared, the player can summon an avatar in the battle to cause the summoned avatar to battle with the enemy character.

When the player wins the battle, victory information including the material used in the battle is sent to the server apparatus 2 from the cellular phone 1 of the player. The sever apparatus 2 transmits a result mail to the cellular phone 1 of the other user, who sent the material used to cast the magic spell or summon the avatar, bs on the victory information sent from the cellular phone 1 of the player. The cellular phone 1 that received the result mail increases the material experience value of the material according to the result mail.

The following will explain exemplary processing in a pseudo-network game system, according to an aspect of the present invention. In the game system of an aspect of the present invention, the game progresses in each phone 1 independently of the other cellular phones. At first, an explanation will be given of processing to be executed by the cellular phone 1 when the player progresses the game. After that, an explanation will be given of processing to be executed by the server apparatus 2 and processing to be executed by the cellular phone 1 of the other user in providing the support material.

Figure 6:
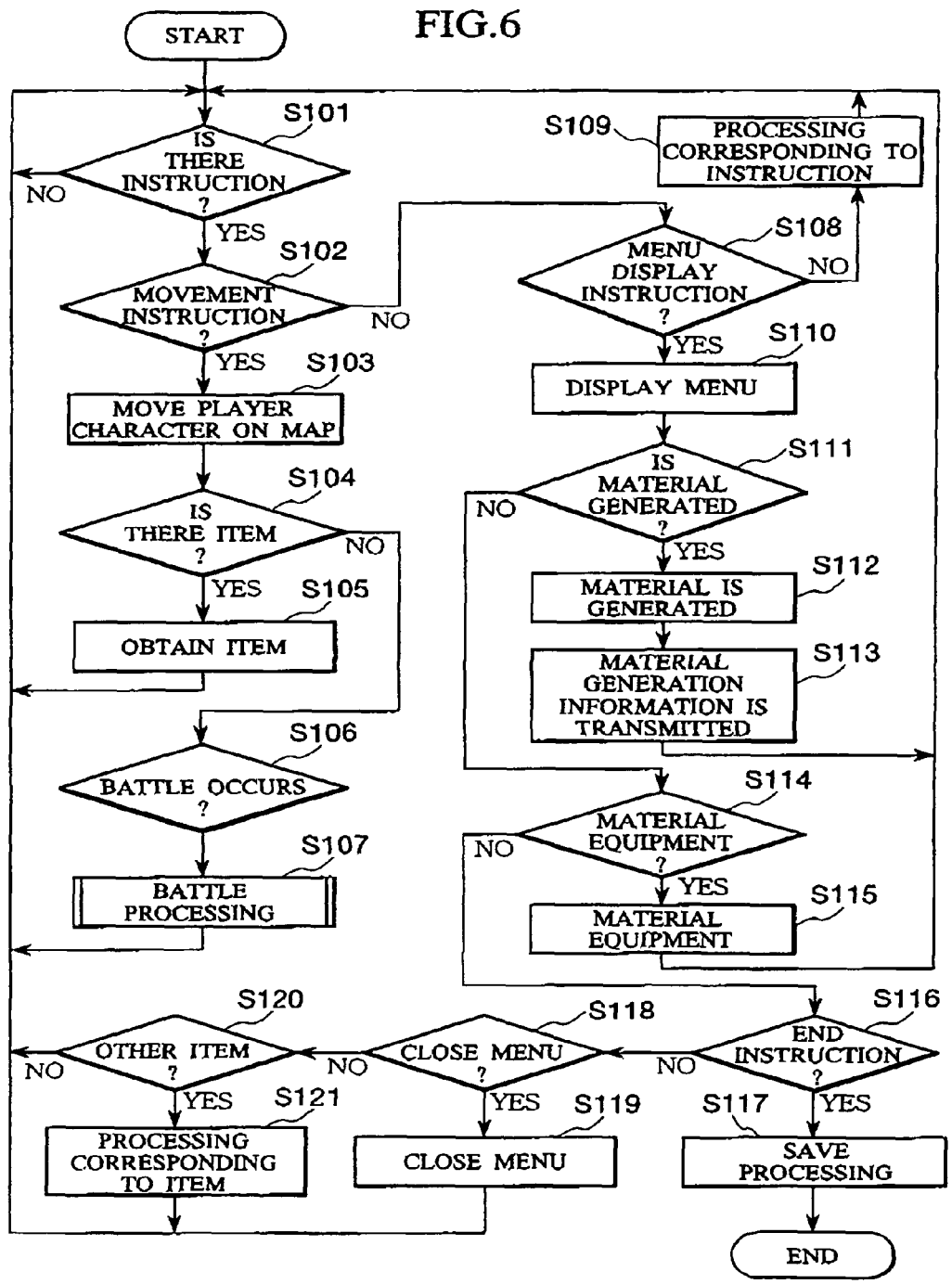
FIG. 6 is a flowchart illustrating processing of a main routine in a game executed by a cellular phone 1.

FIG. 6 is a flowchart illustrating exemplary processing of a main routine in the game according to an embodiment. When the processing of the main routine is started, the CPU 11 determines whether a player's instruction is input from the input device 14 (step S101). Until the player's instruction is input from the input device 14, the CPU 11 repeats processing in step S101 and waits for an input instruction from the player.

When the player's instruction is input, the CPU 11 determines whether the input instruction is a movement instruction provided to the player character (step S102). When the input instruction is a movement instruction, the CPU 11 moves the player character on a map formed in a virtual space (step S103).

The CPU 11 determines whether the player character reaches an item obtaining point on the map as a result of movement (step S104). When the player character reaches an item obtaining point, the CPU 11 causes the player character to obtain an item and adds the obtained item to the possessed item table 102 (step S105). Then, processing returns to processing in step S101.

When the player character does not reach an item obtaining point, the CPU 11 determines whether the player character reaches a battle occurring point on the map (step S106). When the player character reaches a battle occurring point, the CPU 11 executes battle processing in which a battle between the player character and the enemy character is waged (step S107). The details of the battle processing will be given later. When the battle processing is ended, processing directly returns to processing in step S101.

When the instruction input by the player is not a movement instruction, the CPU 11 determines whether the instruction is a main menu display instruction (step S108). When the input instruction is not a main menu display instruction, the CPU 11 performs other processing according to the contents of the instruction (step S109). The processing to be executed here includes processing for terminating the game when a final event of the game is cleared. Because processing in step S109 is not directly related to the present invention, detailed explanation is omitted. After, S109, processing goes back to step S101.

When the instruction is the main menu display instruction, the CPU 11 generates a main menu and causes the display device 15 to display the main menu (step S110). The material generation and the material menu are selected according to the main menu. The player cannot select material generation from the main menu when the player character does not posse a material gemstone. The player cannot select material equipment from the main menu when the player character does not posses a material other than the material with which the player character is equipped.

The CPU 11 determines whether the player operates the input device 14 to select material generation from the main menu (step S111). When material generation is selected from the main menu, the CPU 11 generates a material from the material gemstone according to the instruction from the input device 14. When the number of already possessed materials reaches a predetermined number, the CPU 11 only generates a new material after one of the materials is discarded according to the player's selection (step S112).

The CPU 11 controls the communications device 16 to establish a data link with the base station 4 to make a logical connection with the server apparatus 2. The CPU 11 generates material generation information indicating the newly generated material is registered in the possessed material table 103, and causes the communications device 16 to transmit the material generation information to the server apparatus 2 via the base station 4. After transmitting the material generation information, the CPU 11 causes the communications device 16 to disconnect the data link with the base station 4 (step S113). Then, processing goes back to processing in step S10.

When material generation is not selected from the main menu, the CPU 11 determines whether the player operates the input device 14 to select equip material (step S114). When equip material is selected, the CPU 11 causes the player character to be equipped with a material selected by the player from the possessed materials. When the player character is already equipped with a material, the CPU 11 causes the player character to be equipped with the material selected by the player in place of the currently equipped material (step S115). Then, processing goes back to step S101.

When material equipment is not selected from the main menu, the CPU 11 determines whether the player operates the input device 14 to select end game from the main menu (step S116). When end game is selected, the CPU 11 saves data of the progress of the game at the present time, such as parameters of the player character, in a predetermined area of the RAM 13 (step S117). Then, processing of this flowchart is ended. In order to start the game again, the CPU 11 can restart the game from the point at which the game is ended by using data saved in the RAM 13.

When the end of the game is not selected, the CPU 11 determines whether the player operates the input device 14 to select the closing of the main menu (step S118). When closing of the main menu is selected, the CPU 11 closes the main menu displayed on the display device 15 (step S119), and processing goes back to step S101.

When closing of main menu is not selected from the main menu, the CPU 11 determines whether the player operates the input device 14 to select another entry from the main menu (step S120). When another entry is selected from the main menu, the CPU 11 performs other processing according to the selected entry (step S121). Since the other processing is not directly related to the present invention, the detailed explanation is omitted. Then, processing goes back to step S101. When an entry is not selected from the main menu, processing directly goes back to step S101.

Figure 7:
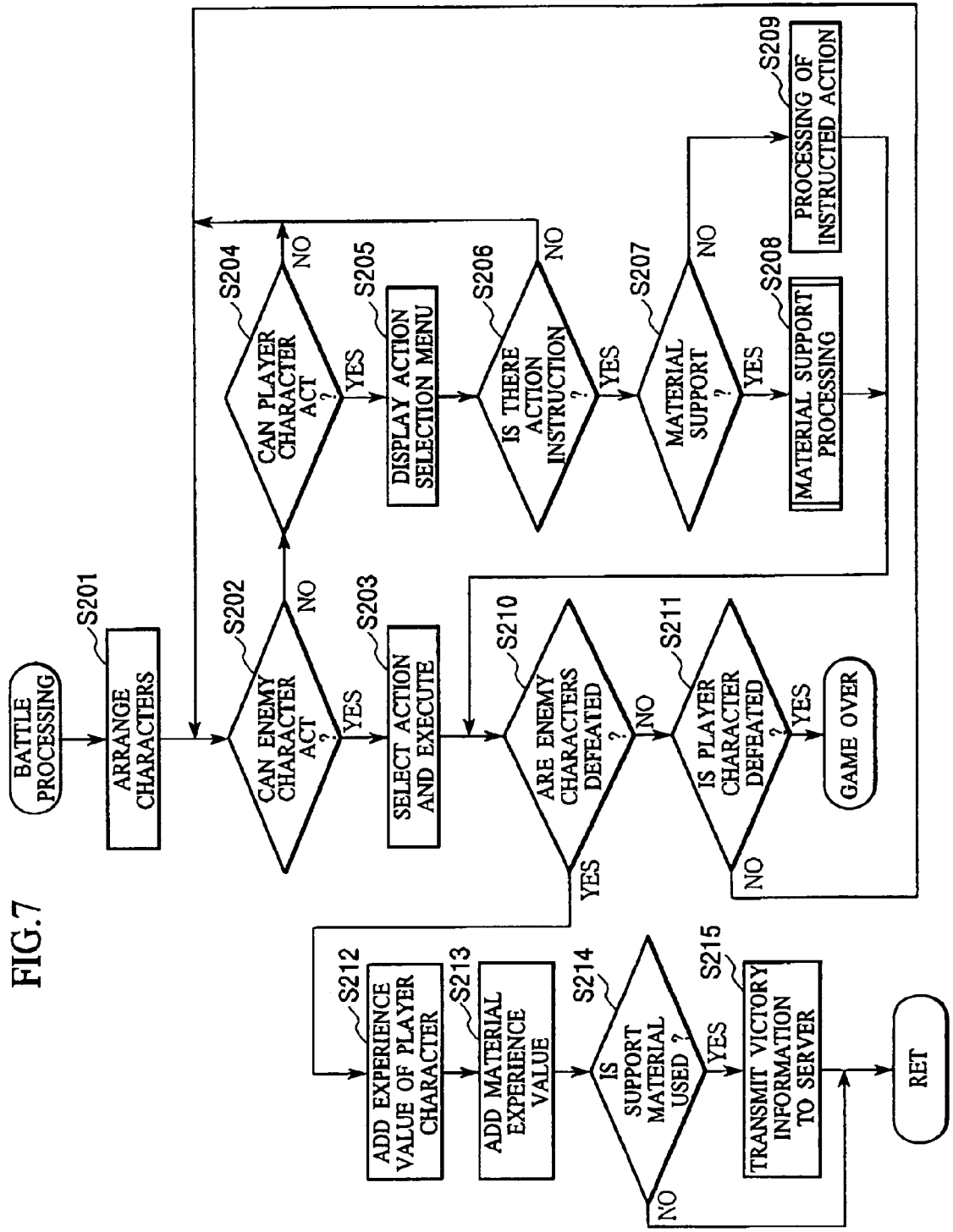
FIG. 7 is a flowchart illustrating battle processing of FIG. 6.

FIG. 7 is a flowchart specifically illustrating an example of battle processing shown in step S107. In battle processing, a battle screen that is being executed is continuously displayed on the display device 15 from the time when the battle is started to the time when the player character is in a battle unable status or all enemy characters are in a battle unable status. Since processing of displaying the battle screen is not directly related to the present invention, the detailed explanation is omitted.

When battle processing is started, the CPU 11 arranges the player character and the enemy characters (e.g., one to three characters) in the battle on a map for battle (step S201). The CPU 11 determines whether there is an enemy character that can act, among the enemy characters joining the battle (step S202). When there is an enemy character that can act, the CPU 11 determines an action of the enemy character and causes the enemy character to perform the action. When the player character suffers damage by an attack from the enemy character, the CPU 11 reduces the HP value of the player character according to the damage (step S203). Then, processing proceeds to step S210.

When there is no enemy character ready for action, the CPU 11 determines whether the player character is ready for action (step S204). When the player character is not ready, processing goes back to step S202 and the CPU 11 repeats determining whether the enemy character can act in step S202 and determining whether the player character can act in step S204.

When the player character is ready, the CPU 11 causes the display device 15 to display an action selection menu for selecting an action of the player character on a front side of a battle screen of the display device 15 (step S205). When the current MP value of the player character does not reach a minimum value necessary for using the magic, the player cannot select the use of the magic and the material support from the action selection menu.

When the action selection menu is displayed, the CPU 11 determines whether the player operates the input device 14 to select any action from the action selection menu (step S206). When an action is not selected, processing goes back to step S202. When the enemy character is ready before the action of the player character is selected, processing in step S203 is executed prior to processing in step S206, thus the enemy character sometimes acts prior to the player character.

When some action is selected from the action selection menu, the CPU 11 determines whether the selected action is material support (step S207). When material support is selected, the CPU 11 performs material support processing (step S208). The details of material support processing will be described later. When material support processing is ended, processing proceeds to step S210.

When material support is not selected, the CPU 11 performs processing according to the selected action. In the case where an attack against the enemy character (including the case of using magic) is selected as an action of the player character, the CPU 11 reduces the HP value of the enemy character according to the damage by the attack. When a magic spell, which corresponds to the material with which the player character is already equipped, is cast, the CPU 11 reduces the MP value according to the cast magic (step S209). Then, processing goes to processing in step S210.

In step S210, the CPU 11 determines whether all enemy characters are in a battle unable status and the player character completely defeats the enemy characters. When the player character does not completely defeat the enemy characters, the CPU 11 determine whether the HP value of the player character is set to zero and the player character is unable to battle (step S211). When the player character is able to battle, processing goes back to step S202. When the player character is unable to battle, the game is over and processing is ended.

When the enemy characters are completely defeated in step S210, the CPU 11 increases the experience value of the player character stored in the parameter table 101 according to the defeated enemy characters. When the experience value reaches a predetermined value, the CPU 11 improves the player character's level stored in the parameter table 101. When improving the player character's level, the CPU 11 also increases the MAX value of HP and the MAX value of MP stored in the parameter table 101 according to the improved level (step S212).

The CPU 11 increases the material experience value stored in the possessed material table 103 in connection with the material with which the player character is equipped. When the material experience value thereby reaches a predetermined value, the CPU 11 improves the material level stored in the possessed material table 103 (step S213). When material support processing is executed in this battle, the CPU 11 determines whether the material provided by another user is used in the battle (step S214).

When the material provided by another user is used in the battle, the CPU 11 controls the communications device 16 to establish the data link with the base station 4 to make a logical connection with the server apparatus 2. The CPU 11 generates victory information including at least the material used in this battle as information and causes the communications device 16 to transmit victory information to the server apparatus 2 via the base station 4. After transmitting the victory information, the CPU 11 causes the communications device 16 to disconnect the data link with the base station 4 (step S215). Then, battle processing is ended and processing returns to the main routine in FIG. 6. When material support processing is not executed or the material support-provided by another user is not used even if material support processing is executed, battle processing is directly ended and processing returns to the main routine in FIC 6.

Figure 8:
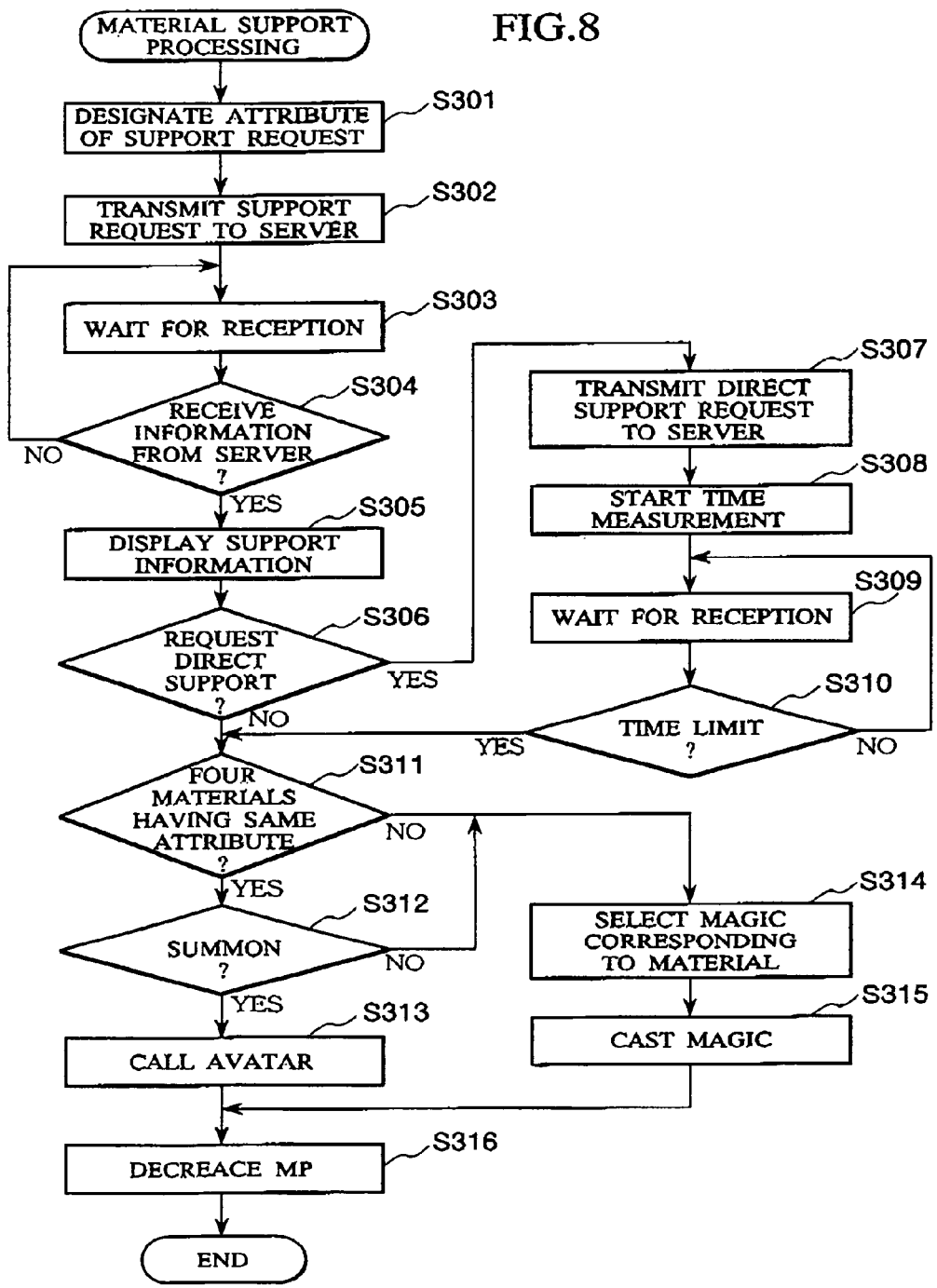
FIG. 8 is a flowchart illustrating material support processing of FIG. 7.

FIG. 8 is a flowchart specifically illustrating an example of material support processing shown in step S208. In material support processing, the player operates the input device 14 to designate an attribute of the material requested for support (step S301). The CPU 11 controls the communications device 16 to establish a data link with the base station 4 to make a logical connection with the server apparatus 2. The CPU 11 causes the communications device 16 to transmit a support request, which includes the designated material attribute as information, to the server apparatus 2 via the base station 4. After transmitting the support request, the CPU 11 causes the communications device 16 to disconnect the data link with the base station 4 (step S302).

After transmitting the support request, the CPU 11 waits to receive support information that is sent from the server apparatus 2 in response to the support request (step S303). The CPU 11 determines whether support material information is received from the server apparatus 2 in a standby state (step S304). When support material information is not received from the server apparatus 2, processing goes back to step S303 and the reception standby state is continued. In receiving support information, the data link between the cellular phone 1 and the base station 4 is established by a signal from the base station 4 and the data link is disconnected when reception is completed. When support material information is received from the server apparatus 2, the CPU 11 causes the display device 15 to display the contents of received support information (step S305).

The player selects whether direct support to directly receive support material from another user should be requested based on support material information displayed on the display device 15. The player may receive a support material, which is not registered in the server apparatus and generated by another user in response to a direct support request. The CPU 11 determines whether direct support is requested by the user's selection (step S306). When direct support is not requested, processing directly goes to step S311.

When direct support is requested, the CPU 11 controls the communications device 16 to establish a data link with the base station 4 to make a logical connection with the server apparatus 2. The CPU 11 causes the communications device 16 to transmit a direct support request, which includes the attribute of the material designated in step S301, to the server apparatus 2 via the base station 4. After transmitting the direct support request, the CPU 11 causes the communications device 16 to disconnect the data link with the base station 4 (step S307). The CPU 1 starts measurement of an elapsed time since the transmission of the direct support request using an internal timer (step S308).

After transmitting the direct support request, the CPU 11 waits to receive support material information that is sent from the server apparatus 2 in response to the direct support request (step S309). The CPU 11 determines whether the elapsed time since the start of time measurement in step S308 reaches a predetermined time limit (step S310). When the elapsed time does not reach the time limit, processing goes back to step S309 and the reception standby state is continued. When the elapsed time reaches the time limit, processing proceeds to step S311.

In step S311, the CPU 11 determines whether material support information, which is sent in response to the support request in step S302 or the direct support request in step S307, indicates the presence of three materials having the same attribute and whether a material having the same attribute as that of these three materials is stored in the possessed material table 103. When material support information indicates the presence of three materials having the same attribute and a material having the same attribute as that of these three materials is stored, four materials having the same attribute are consequently prepared in total (step S311).

When four materials having the same attribute are prepared in total, summon magic can be used. In the case where the MP value of the player character is insufficient to use the summon magic, the use of the summon magic cannot be selected even if four materials having the same attribute are prepared. When the summon magic can be used, the player operates the input device 14 to select whether the summon magic should be used. The CPU 11 determines whether the use of the summon magic is selected (step S312).

When the use of the summon magic is selected, the CPU 11 calls an avatar, which is a character different from the player character, and causes the avatar to battle with the enemy character. When damage is caused to the enemy character by the attack from the summoned avatar, the CPU 11 reduces the HP value of the enemy character according to the damage (step S313). Then, processing proceeds to step S316.

When four materials having the same attribute are not prepared or the use of the summon magic is not selected, even if four materials are prepared, the player operates the input device 14 to select a magic type, which is used by the player character. The magic type is selected from magic types, which correspond to the attribute of the provided support material or that of the material with which the player character is equipped and which can be used with the current MP value (step S314).

The CPU 11 causes the player character to cast the selected magic. When an attack magic is cast, the player character attacks the enemy character. When a defense magic is cast, an attack from the enemy character is defended by setting a parameter for reducing damage caused when the player character receives the attack. When damage is caused to the enemy character by the attack due to the attack magic, the CPU 11 reduces the HP value of the enemy character according to the damage. When a recovery magic is cast, the CPU 11 increases the HP value of the player character (step S315). Then, processing proceeds to step S316.

In step S316, the CPU 11 reduces the MP value of the player character stored in the parameter table 101 by the value corresponding to the avatar called in step S313 or the value corresponding to the magic cast in step 315. Then, material support processing is ended and processing returns to battle processing in FIG. 7.

Figure 9:
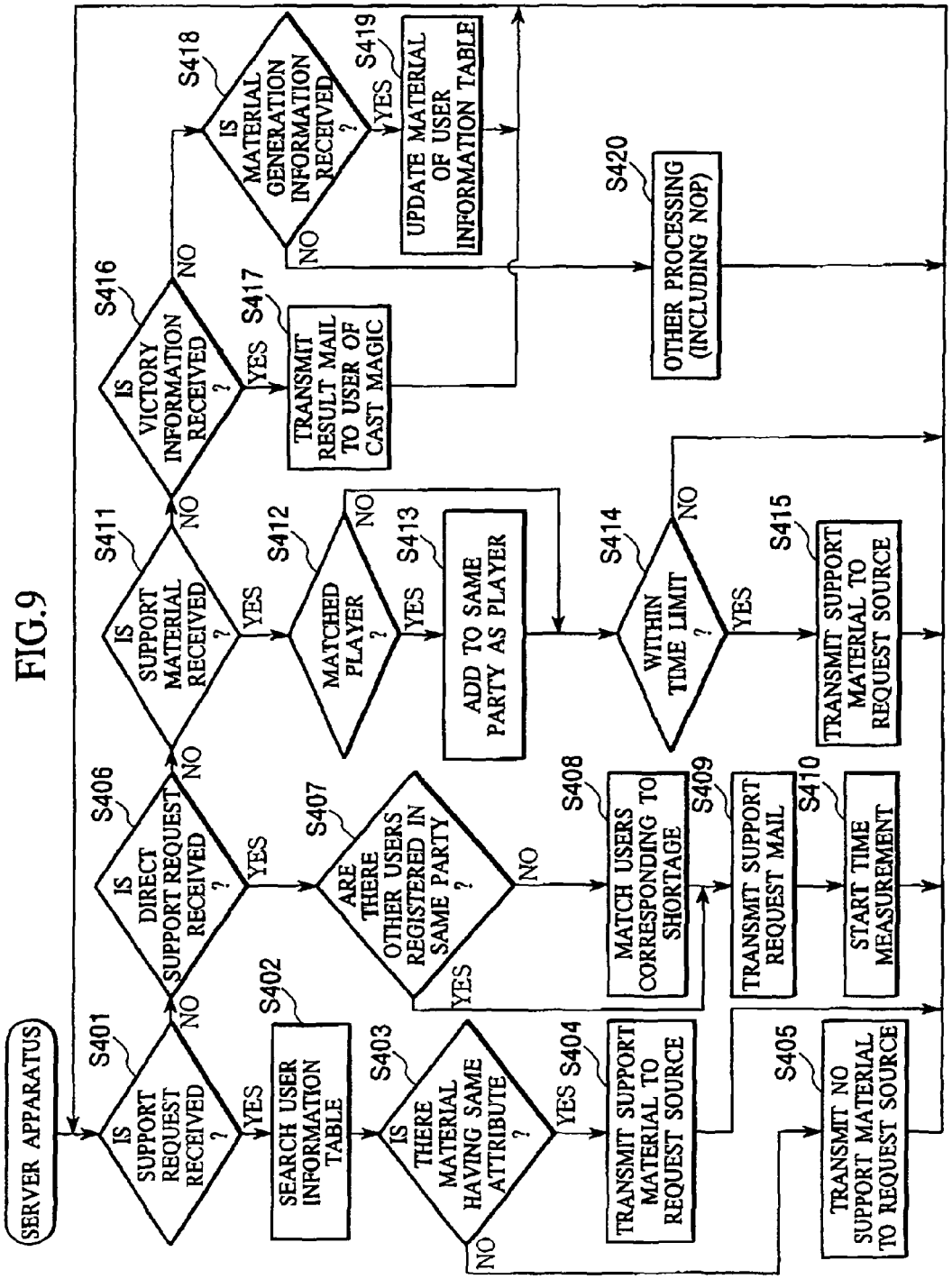
FIG. 9 is a flowchart illustrating processing executed by a server apparatus in the material support processing.

In material support processing, support material from another user can be obtained by sending the support request or direct support request to the server apparatus 2 from the player's cellular phone 1. Accordingly, material support processing is also executed by the server apparatus 2 and the other user's cellular phone 1. The following will explain processing executed by the server apparatus 2 and processing executed by other cellular phone 1 in connection with material support processing, FIG. 9 is a flowchart illustrating exemplary processing executed by the server apparatus 2 in connection with material support processing. This flowchart specifically explains only processing relating to material support processing by the server apparatus 2. The control section 22 determines whether the server apparatus 2 receives the support request transmitted from the player's cellular phone 1 in step S302 (step S401).

When the server apparatus 2 receives the support request, the control section 22 searches for a material having an attribute indicated in the support request from the materials registered in the user information table 200 in connection with the other users belonging to the same party as the player of the cellular phone 1 who transmitted the support request (step S402). The control section 22 determines whether a material having the attribute indicated in the support request is found as a result of searching the user information table (step S403).

When a material having the attribute indicated in the support request is extracted, the control section 22 transmits support material information, which indicates the found material and the user of the material, to the network 3 using the requesting cellular phone 1 as a destination. Support material information is sent to the base station 4 that performs signal exchange with the requesting cellular phone 1. The base station 4, which received support material information, establishes a data link with the cellular phone 1 to transmit support material information to the cellular phone 1. When the cellular phone 1 completes reception or support material information, the data link is disconnected (step S404). Then, processing goes back to step S401.

When a material having an attribute indicated in the support request is not searched, the control section 22 transmits support material information, which indicates the absence of the material having the requested attribute, to the network 3 using the requesting cellular phone 1 as a destination. Support material information is routed via the network 3 to the base station 4 that performs signal exchange with the requesting cellular phone 1. The base station 4, which received the support material information, establishes a data link with the cellular phone 1 to transmit support material information to the cellular phone 1. When the cellular phone 1 completes reception of support material information, the data link is disconnected (step S405). Then, processing goes back to step S401.

When the server apparatus 2 does not receive the support request, the control section 22 determines whether the server apparatus 2 receives the direct support request transmitted from the player's cellular phone 1 in step S307 (step S406). When the server apparatus 2 receives the direct support request, the control section 22 determines whether three other users are registered in the party to which the player of the requesting cellular phone 1 belongs to, based on the user information table 200 (step S407). When three other users are registered, processing directly proceeds to step S408.

When three other users are not registered in the same party, the control section 22 selects users corresponding to a shortage (for example, two users when only one other user is registered in the same party) among the users, who do not yet belong to any party (step S408). The user fulfilling the shortage can be extracted by matching processing if a profile of each user is registered in the user information table 200. Alternatively, the user fulfilling the shortage may be extracted completely at random. Then, processing proceeds to step S409.

In step S409, the control section 22 sets mail addresses of the other users belonging to the same party as the player of the cellular phone 1, who transmitted the direct support request, and the other users extracted in step S408 as destination addresses. Then, the control section 22 causes the communications interface 27 to send a support request mail to the network 3. The support request mail includes the player, who requests the direct support, the attribute of the requested support material, and a startup menu for an application program as information. The support request mail is subjected to addressing by the network 3, and reaches each base station 4 that performs signal exchange with the cellular phone 1 corresponding to the destination address. Each base station 4, which received the support request mail, establishes a data link with the requesting cellular phone 1, and transmits the support request mail to the cellular phone 1. The support request mail is thus sent to the cellular phone 1 of the users other than the requesting player. When the cellular phone 1 completes reception of the support request mail, the data link is disconnected. After transmitting the support request mail to the network 3, the control section 22 starts time measurement using the internal timer (step S410). Then, processing goes back to step S401.

When the server apparatus 2 does not receive the direct support request, the control section 22 determines whether the server apparatus 2 receives support material information transmitted from one of the other cellular phones 1 in response to the support request mail in step S409 (step S411). When the server apparatus 2 receives support material information, the control section 22 determines whether the user of the cellular phone 1, who transmitted the support material information, is the user extracted by processing in step S40 (step S412).

When the user of the cellular phone 1 is the user extracted by processing in step S408, the control section 22 updates the user information table 200 so that the party to which the extracted user belongs becomes the same party as the player of the requesting cellular phone 1 (step S413). Then, processing proceeds to step S414. When the user of the cellular phone 1 is not the user extracted by processing in step S408, processing directly goes to step S414.

In step S414, the control section 22 determines whether the elapsed time since the start of time measurement in step S410 is within a predetermined limit time. When the elapsed time passes the limit, processing directly goes back to step S401. When the elapsed time is within the limit, the control section 22 transmits support material information, which indicates the provided support material and the user of the material, to the network 3, with the requesting cellular phone 1 as a destination. Support material information reaches the base station 4 that performs signal exchange with the requesting cellular phone 1 by addressing in the network 3. The base station 4, which received support material information, establishes a data link with the requesting cellular phone 1 to transmit support material information to the cellular phone 1. When the requesting cellular phone 1 completes reception of the support material information, the data link is disconnected (step S415). Then, processing goes back to step S401.

When the server apparatus 2 does not receive support material information, the control section 22 determines whether the server apparatus 2 receives victory information transmitted from the cellular phone 1 in step S215 (step S416). When the server apparatus 2 receives victory information, the control section 22 sets the mail address registered in the user information table 200 as a destination address in connection with the user, whose support material was used in casting the magic or summoning the avatar in the indicated battle. Moreover, the control section 22 causes the communications interface 27 to transmit a result mail to the network 3. The result mail includes the corresponding material and a startup menu for an application program. The result mail is subjected to addressing by the network 3 and reaches the base station 4 that performs signal exchange with the cellular phone 1 corresponding to the destination address. The base station 4, which received the result mail, establishes a data link with the cellular phone 1 as a destination to transmit the result mail to the cellular phone 1. When the cellular phone 1 as the destination completes reception of the result mail, the data link is disconnected (step S417). Then, processing goes back to step S401.

When the server apparatus 2 does not receive victory information, the control section 22 determines whether the server apparatus 2 receives, material generation information transmitted from the cellular phone 1 in step S113 or material generation information transmitted from the other cellular phone 1 in step S506 (step S418). When the server apparatus 2 receives material generation information, the control section 22 updates the material registered in the user information table 200 regarding the user, who transmitted the relevant material generation information, to the contents indicated by the material generation information (step S419). Then, processing goes back to step S401.

When the server apparatus 2 does not receive material generation information either, the control section 22 performs other processing (including NOP (Non-Processing)) (step S420). Since the other processing is not directly related to the present invention, the detailed explanation is omitted. Then, processing goes back to step S401.

An explanation will be next given of processing executed by the cellular phone 1 of the other user, who receives a material support request, on the assumption that the application program for the game is not being executed by the cellular phone 1 of the other user.

Figure 10A:
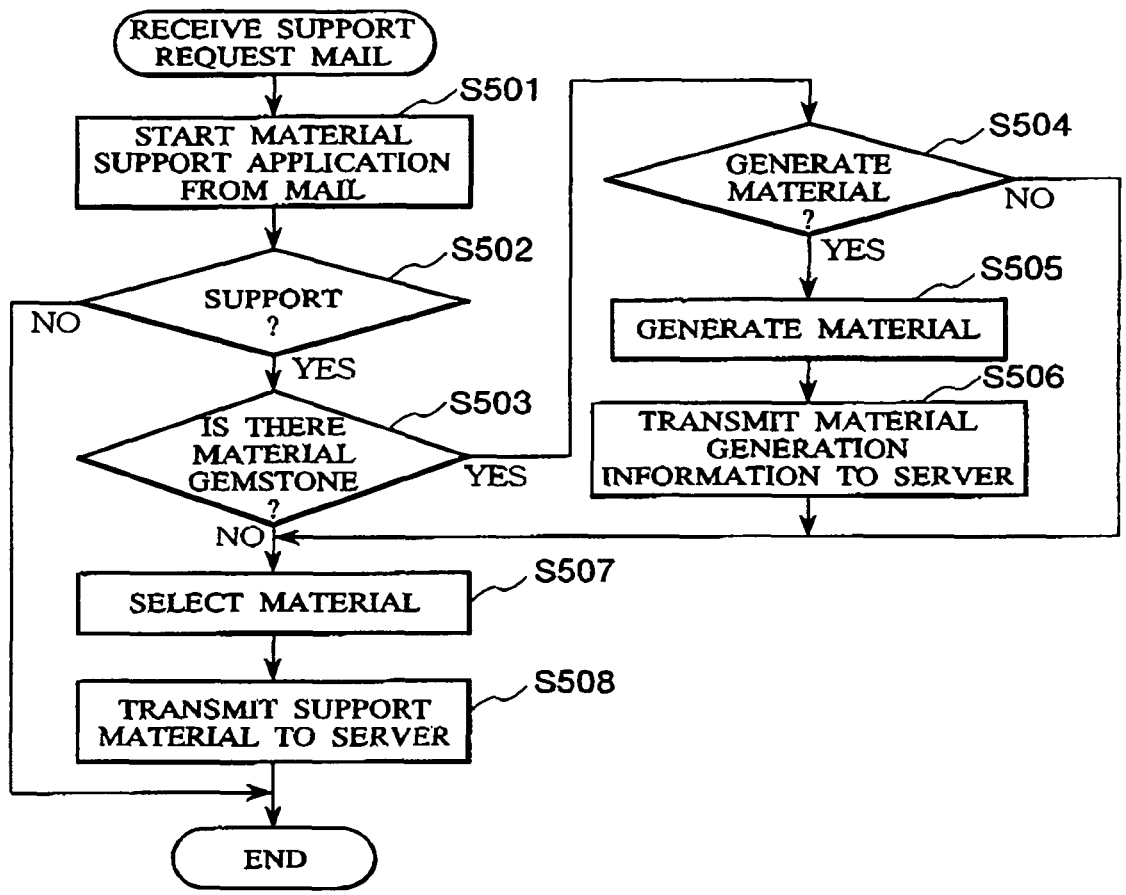
FIG. 10A is a flowchart illustrating processing executed by another cellular phone that receives a support request mail.

FIG. 10A is a flowchart illustrating exemplary processing executed by the cellular phone 1 of another user when receiving the support request mail transmitted in step S409. The CPU 11 causes the display device 15 to display the received support request mail. When the player operates the input device 14 to instruct the start of the application program from the start menu for the support request mail, the CPU 11 causes the application program to be started. The CPU 11 causes the display device 15 to display a selection menu for whether the material support should be provided according to the started application program (step S501).

The user operates the input device 14 according to the selection menu displayed on the display device 15 to select whether the material support should be provided. The CPU 11 determines whether provision of the material support is selected according to the selection menu (step S502). When no provision of the material support is selected, processing in the flowchart is directly ended. When provision of the material support is selected, the CPU 11 determines whether one or more material gemstones are registered in the possessed item table 102 (step S503). When no gemstone is registered in the possessed item table 102, processing directly goes to step S507.

When the material gemstone is registered in the possessed item table 102, the user operates the input device 14 according to the selection menu displayed on the display device 15 to select whether a material should be generated. The CPU 11 determines whether material generation is selected according to the selection menu (step S504). When material generation is selected, the CPU 11 generates a material from the material gemstone according to the instruction from the input device 14 by the player. When the number of possessed materials is five, the CPU 11 causes the player to discard one of the materials to generate a new material (step S505).

The CPU 11 controls the communications device 16 to establish a data link with the base station 4 to make a logical connection with the server apparatus 2. The CPU 11 generates material generation information indicating that newly generated material is registered in the possessed material table 103, and causes the communications device 16 to transmit the material generation information to the server apparatus 2 via the base station 4. After transmitting the material generation information, the CPU 11 causes the communications device 16 to disconnect the data link with the base station 4 (step S506). Then, processing directly goes to processing in step S507.

In step S507, the CPU 11 causes the display device 15 to display the materials registered in the possessed material table 103 in list form. The user selects a support material, to provide to the player, who requested direct support, from the listed materials. The CPU 11 generates support material information that can specify the user, the support material and the requesting player. The CPU 11 controls the communications device 16 to establish a data link with the base station 4 to transmit the support material information. After transmitting the support material information, the CPU 11 causes the communications device 16 to disconnect the data link with the base station 4 (step S508). Then, processing in this flowchart is ended.

Figure 10B:
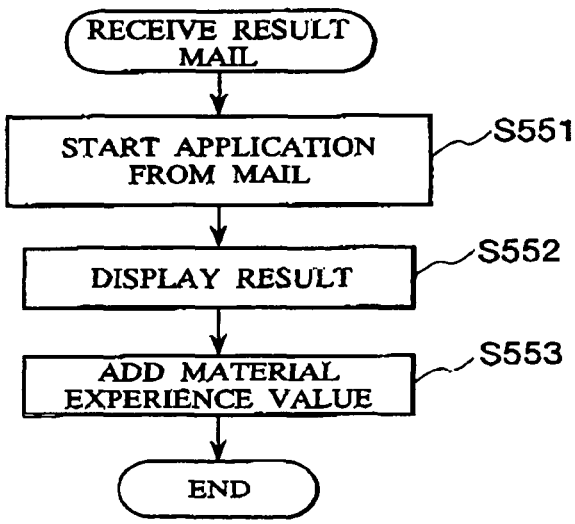
FIG. 10B is a flowchart illustrating processing executed by another cellular phone that receives a result mail.

FIG. 10B is a flowchart illustrating processing executed by the cellular phone 1 of another user when receiving the result mail transmitted in step S417. The CPU 11 causes the display device 15 to display the received result mail. When the player operates the input device 14 to instruct the start of the application program from the starting menu of the result mail, the CPU 11 starts the application program (step S551). The CPU 11 causes the display device 15 to display information indicated by the result mail according to the started application program (step S552).

The CPU 11 increases the material experience value registered in the possessed material table 103 in connection with the material indicated by the result mail. The CPU 11 also increases the material level when the material experience value reaches a predetermined value (step S553). Then, processing in this flowchart is ended.

During the execution of the game by the cellular phone 1 of the other user, the application program has already been started. When the cellular phone 1 of the other user receives the support request mail or result mail in a state that the application program has already been started, the CPU 11 stops the execution of the game. The CPU 11 may execute processing illustrated in FIG. 10A or FIG. 10B after stopping the execution of the game. When the mail is closed from the support request mail or result mail without starting the application program, processing in FIG. 10A or FIG. 10B is not executed. After reopening the once closed support request mail or result mail, the CPU 11 can execute processing illustrated in FIG. 10A or FICG 10B.

As explained above, in the game system according to the present invention, the game can be independently progressed by each cellular phone 1. The player can equip the player character with a material generated from a material gemstone obtained during progress of the game and use the magic according to the equipped material. Each cellular phone 1 can progress the game without performing transmission and reception of information to and from the server apparatus 2.

Only when the need arises to transmit and receive information between the cellular phone 1 and the server apparatus 2, the data link between the cellular phone 1 and the nearby base station 4 that performs signal exchange with the cellular phone 1 is established. When transmission and reception of necessary information is ended, the data link between the cellular phone 1 and the base station 4 is disconnected. In the state that the data link with the base station 4 is disconnected, the cellular phone 1 is not logically connected to the server apparatus 2. Namely, the cellular phone 1 is not always connected to the server apparatus 2.

Since the cellular phone 1 and the server apparatus 2 are not always connected to each other, the server apparatus 2 does not always have to control whether each cellular phone 1 is in a connection state. This makes it possible to reduce processing by the server apparatus 2. The cellular phone 1 is connected to the server apparatus 2 only when the cellular phone 2 transmits information to the server apparatus 2 or receives information from the server apparatus. The cellular phone 1 is not constantly connected to the server apparatus 2. Accordingly, even when a network access fee is charged according to an amount of information to be transmitted and received or a connection time, the network access fee, which is charged to the player, is not increased.

In contrast to this, when a need arises in battle, the player who is executing the game by the cellular phone 1, can receive support information including another user's materials registered in the user information table 200 by transmission of the support request to the server apparatus 2. The player can use not only the material with which his/her player character is equipped but also the materials included in support information in the battle. This is equivalent to the case that the player immediately receives the material support from another user as a need arises. The game system according to this embodiment realizes the same functions as those of the network game that progresses the game in cooperation with the users even if the cellular phones 1 and the server apparatus 2 are not always connected to each other.

Among the materials of the other users registered in the user information table 200, the support material, which is selected to be provided to the player from the player of the cellular phone 1 in response to the support request, is limited to the material possessed by the other users belonging to the same party as the player. Since the users who belong to the same party provide support material to one another, a sense of camaraderie among the users belonging to the same party is improved.

When the player cannot obtain sufficient material support in response to the support request, the player can further request direct support. When the direct support request is transmitted to the server apparatus 2, the support request mail is transmitted to the cellular phone 1 of other users. The other users can provide support material in response to the support request mail. Therefore, the other user can feel that support is really provided to the player and a sense of camaraderie among the users is improved.

When the number of other users belonging to the same party as the player, who requested the direct support, is less than, for example, three, the support request mail is also transmitted to users filling the shortage. These users can be extracted from a pool of other users who do not belong to any party. The other user, who received the support request mail, consequently joins the same party as the requesting player by providing a support material. This makes it possible to easily compose a party including multiple users. Since the party is composed of the users who provide the support materials or receive the support materials, a sense of camaraderie among the users is improved.

When the user of each cellular phone 1 receives the support request mail from a player, he/she can generate a new material at this point and select the newly generated material as support in addition to the already possessed materials. Therefore, the other user can feel that support is really provided to the player and a sense of camaraderie among the users is improved.

The material experience value can be increased when the player character equips the material. When the magic corresponding to the support material provided by the other player is used to win a battle, the material experience value can also be increased even when the user is not executing the game. When the material experience value is increased by providing support to the other player, the material level is increased according to the experience value. The user himself/herself can receive a profit by providing material support to the other player. This makes it possible to accelerate the progress of the game in cooperation with the users.

The material has any one of multiple types of attributes and the player character can cast a magic spell according to the attribute of the material. The player can designate the attribute of the material when requesting material support. The other user can provide material support according to the player's designation. Since the player can obtain the necessary material type during progress of the game by requesting the material support, the game can smoothly progress by requesting the material support.

When, for example, four materials, which include the provided support materials and the possessed materials and which have the same attribute, are prepared, the player can select not only magic casting but also avatar summoning as the player character's action. When the material support is not requested, the summoning of an avatar cannot be selected. In this way, the summoning of the avatar can only be selected by requesting the material support. This motivates the player to request the support material from the other users. Since the summoning of the avatar can be selected when four materials having the same attribute are prepared, the player is motivated to request the material support even when the player possesses the material having a desired attribute.

The present invention is not limited to the aforementioned embodiments, and various modifications and applications may be possible. The following will explain some modifications of the aforementioned embodiments to which the present invention can be applied.

In the aforementioned embodiments, the player first sends the support request to receive the support of the material registered in the user information table 200 of the server apparatus 2. The player then sends the direct support request to receive the support material from other users. The player may request the direct support, even when the material registered in the user information table 200 is provided to the player. The material support may be provided to the player by only support request. The material support may also be provided to the player by only direct support request.

When the material support is provided to the player by only the direct support request, the user information table 200 does not have to be stored in the server apparatus 2. In this case, each cellular phone 1 does not have to be always connected to the server apparatus 2. In the battle, the player can use the material obtained by the other user in the progress of the game. This makes it possible to implement the same functions of a network game that progresses the game in cooperation with multiple users.

In the aforementioned embodiments, when there are four materials having the same attribute in the support materials provided in response to the support request and/or the direct support request and the materials possessed by the player character, the player can summon the avatar in the battle. In contrast to this, when there are three materials having the same attribute in the support materials provided in response to the support request and/or the direct support request, the player may summon the avatar in the battle even if the player character does not possess the material having the same attribute.

The player may cast the magic using each provided support material. For example, the player can cast the recovery magic only one time if the number of recovery materials, which are provided from the other user in response to the request for recovery material, is one. However, if the number of recovery materials, which are provided from the other user, is three, the player may cast the recovery magic continuously three times. When the player selects the material support action as the player character action, he/she may cast only the magic according to the provided support material and he/she cannot cast the magic according to the material originally possessed by the player character.

In the aforementioned embodiments, the material is generated when the player character exists on a map other than a battle map or the direct support request is received from the other player based on the material gemstone obtained when the player character is moved to the predetermined point on the map. However, the material obtaining method is not limited to the above method. For example, the player character may obtain the material itself when being moved to the predetermined point on the map. The player character may obtain the material (or material gemstone) according to the result of a lottery or magic game when receiving the direct support request from the other player. The player character may obtain both a material having a predetermined attribute and a material gemstone. When the cellular phone 1 includes a camera, the user can determine the attribute of the generated material based on a material gemstone corresponding to an image photographed by the camera.

In the aforementioned embodiment, when the player wins the battle using the provided support material, the material experience value is increased in connection with only the material used to cast the magic in the battle. In contrast to this, regardless of whether the player uses the magic in the battle, the material experience value of the provided support material may be increased. Regardless of whether the player wins the battle, the material experience value of the provided support material may be increased.

In the aforementioned embodiments, the support, which the player can receive from the other users in the progress of the game, is limited to the support using the material possessed by the other users. However, the support, which the player can receive from the other users, is not limited to the materials possessed by the other users. For example, a game item other than the materials possessed by the player character of the user, who received the support request or direct support request from the player, may be provided to the player. In the case of support using the game item, though the number of items possessed by the player character of the other user is reduced, the experience value of the player character of the user, who provided such support, may be increased.

In the aforementioned embodiments, if the user who provides the material support upon the direct support request does not belong to any party, the user joins the same party as the requesting player. The party including the multiple users can be formed only by this method. However, the formation of the party including the multiple users is not limited to this. The user, who forms the party, may be designated in advance. For example, there is a case in which the user participates in the game together with a friend. The user may arbitrarily leave the party to which he/she once belonged.

In the aforementioned embodiments, the cellular phone 1 is used as a terminal apparatus for executing the game by the user. In contrast to this, other types of terminal apparatuses such as a video game apparatus, a general-purpose personal computer, and a portable video game apparatus may be used if the apparatus includes similar structural components as those of the cellular phone 1. The direct support request can be executed only when the terminal apparatus, which can transmit and receive mail immediately, is used.

In the aforementioned embodiments, the game program (application program) executed by the cellular phone 1 is downloaded from the server apparatus 2 and stored in the ROM 12. In contrast to this, it is possible to provide a cellular phone in which a game program is prestored in the ROM 12. In this case, the ROM 12 may be one in which electrical data writing is impossible. In the case where a memory card in which a program is stored can be attached to the cellular phone 1, the memory card in which the game program (application) is stored can be distributed separately from the cellular phone 1. The game program (application program) can be distributed by various methods according to the type of the terminal apparatus used as a platform.

In the aforementioned embodiments, the programs and data of the server apparatus 2 are stored on the storage medium 26. In contrast to this, the programs and data may be prestored in the HDD 24. The programs and data may be stored on a fixed disk apparatus included in another server apparatus existing on the network 3. The other server apparatus may convert the program and data stored in the fixed disk apparatus to a signal and superimpose the signal on a carrier wave according to the request from the server apparatus 2, and distribute it to the server main body 20 via the network 3. For example, the program and data, which the communications interface 27 receives from the other server apparatus, can be stored in the HDD 24 and loaded to the RAM 23 at an executing time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A game system comprising a server and multiple terminals each of which progresses a game with a player character, the multiple terminals being intermittently connected to the server via a network for transmission and reception of information to and from the server so that the server does not control whether each terminal of the multiple terminals is in a connection state,
   each of the multiple terminals comprising:
   a game element obtainer that obtains a game element that can be used by a corresponding player character during a progress of the game;
   a terminal-side game element storage that stores the obtained game element;
   a terminal-side game element transmitter that establishes a first connection with the server to transmit information of the obtained game element to the server via the network, and terminates the first connection after the information of the obtained game elements is transmitted; and
   a game progressor that progresses the game using the obtained game element, the game progressor comprising:
   a terminal-side support request transmitter that establishes a second connection with the server to transmit a support request to the server via the network, and terminates the second connection after the support request is transmitted;
   a terminal-side game element receiver that receives information of a support game element from the server after transmitting the support request to the server; and
   a support progressor that progresses the game using the support game element identified by the information received by the terminal-side game element receiver,
   the server comprising:
   a server-side game element receiver that receives the information of the obtained game element transmitted from the terminal-side game element transmitter of a supporting terminal of the multiple terminals;
   a server-side game element storage that stores the obtained game element identified by the information received by the server-side game element receiver as a support game element;
   a server-side support request receiver that receives the support request transmitted from the terminal-side support request transmitter of a receiving terminal of the multiple terminals; and
   a server-side game element transmitter that establishes a third connection with the receiving terminal to transmit the information of the support game element, stored in the server-side game element storage, to the terminal-side game element receiver of the receiving terminal in response to the server-side support request receiver receiving the support request, and terminates the third connection after the information of the support game element is transmitted,
   wherein the supporting terminal is different than the receiving terminal, and
   the supporting terminal and the receiving terminal each belong to a same party in the game for jointly supporting one another during the progress of the game.

2. The game system according to claim 1,
   wherein each game element includes a parameter that provides a degree of advantage in the progress of the game,
   wherein the game progressor further comprises:
   a parameter changer that changes the parameter of a selected game element according to the progress of the game when the game is progressed using the selected game element; and
   a terminal-side support result transmitter that establishes a fourth connection with the server to transmit information of the game progress result to the server via the network when the game is progressed using the support game element identified by information received by the terminal-side game element receiver of the receiving terminal, and terminates the fourth connection after the information of the game progress result is transmitted,
   wherein the server further comprises:
   a server-side support result receiver that receives the information of the game progress result from the terminal-side support result transmitter; and
   a server-side support result transferor that establishes a fifth connection with the supporting terminal to transfer the information of the game progress result via the network to the supporting terminal corresponding to the support game element identified by the information transmitted from the server-side game element transmitter, and terminates the fifth connection after the information of the game progress result is transferred, wherein the supporting terminal further comprises:
a terminal-side support result receiver that receives the information of the game progress result transferred from the server-side support result transferor; and
a support time parameter changer that changes the parameter included in the support game element stored in the terminal-side game element storage according to the game progress result indicated by the information received by the terminal-side support result receiver.

3. The game system according to claim 1,
wherein the game comprises multiple types of game elements,
wherein the terminal-side support request transmitter designates one of the multiple types of game elements selected by the receiving terminal in the support request, and
wherein the server-side game element transmitter establishes the third connection to transmit the information of the support game element of the one of the multiple types of game elements designated by the support request of the receiving terminal to the terminal-side game element receiver of the receiving terminal, and terminates the third connection, when the support game element of the type designated by the support request of the receiving terminal is stored in the server-side game element storage.

4. The game system according to claim 1,
wherein the server-side game element storage stores game elements for each party formed by multiple ones of the multiple terminals.

5. The game system according to claim 1,
wherein the server further comprises:
a server-side support request transmitter that establishes a sixth connection with the supporting terminal to transfer the support request received from the receiving terminal to the supporting terminal in response to the server-side support request receiver receiving the support request, and terminates the sixth connection after the support request is transferred; and
a support time game element receiver that receives the information of the game element from the supporting terminal after transmitting the support request to the supporting terminal, and
wherein the supporting terminal further comprises:
a terminal-side support request receiver that receives the support request transmitted from the server-side support request transmitter; and
a support time game element transmitter that establishes a seventh connection with the server to transmit the information of the game element stored in the terminal-side game element storage to the support time game element receiver of the server after the terminal-side support request receiver receives the support request, and terminates the seventh connection after the information of the game element is transmitted.

6. The game system according to claim 5,
wherein the receiving terminal further comprises:
an additional support request transmitter that establishes an eighth connection with the server to transmit an additional support request to the server via the network, and terminates the eighth connection after the additional support request is transmitted,
wherein the server further comprises:
an additional support request receiver that receives the additional support request transmitted from the additional support request transmitter of the receiving terminal; and
an additional support request transferor that establishes a ninth connection with the supporting terminal to transfer the additional support request to the supporting terminal in response to the additional support request receiver receiving the additional support request, and terminates the ninth connection after the additional support is transferred.

7. The game system according to claim 5,
wherein the game element obtainer comprises a support time game element obtainer that obtains a new game element according to a player's instruction in response to receiving the support request transferred from the server-side support request transmitter, and
wherein the support time game element transmitter establishes the seventh connection to transmit information of the new game element obtained by the support time game element obtainer to the server, and terminates the seventh connection after the information of the new game element is transmitted.

8. The game system according to claim 1, wherein the support progressor progresses the game according to a quantity of game elements received by the terminal-side game element receiver.

9. The game system according to claim 1, wherein the support progressor progresses the game according to a sum of a number of game elements received by the terminal-side game element receiver and a number of game elements stored in the terminal-side game element storage.

10. A game system comprising a server and multiple terminals each of which progresses a game with a player character, the multiple terminals being intermittently connected to the server via a network for transmission and reception of information to and from the server so that the server does not control whether each terminal of the multiple terminals is in a connection state,
each of the multiple terminals comprising:
a game element obtainer that obtains a game element that can be used by the corresponding player character during a progress of the game;
a game element storage that stores the obtained game element;
a game progressor that progresses the game using the obtained game element, the game progressor comprising:
a terminal-side support request transmitter that establishes a first connection with the server to transmit a support request to the server via the network, and terminates the first connection after the support request is transmitted;
a terminal-side game element receiver that receives information of a support game element from the server in response to transmitting the support request to the server; and
a support progressor that progresses the game using the support game element identified by the information received by the terminal-side game element receiver,
the server comprising:
a server-side support request receiver that receives the support request transmitted from the terminal-side support request transmitter of a receiving terminal of the multiple terminals;

a support request transferor that establishes a second connection with a supporting terminal of the multiple terminals to transfer the support request received by the server-side support request receiver to the supporting terminal in response to the server-side support request receiver receiving the support request, and terminates the second connection after the support request is transferred;

a server-side game element receiver that receives the information of the support game element from the supporting terminal after the support request transferor transfers the support request to the supporting terminal; and a game element transferor that establishes a third connection with the receiving terminal to transfer the information of the support game element to the terminal-side game element receiver of the receiving terminal in response to the server-side game element receiver receiving the information of the support game element, and terminates the third connection after the information of the support game element is transferred, wherein the supporting terminal further comprises:

a terminal-side support request receiver that receives the support request transferred from the support request transferor; and a game element transmitter that establishes a fourth connection with the server to transmit the information of the support game element to the server-side game element receiver of the server after receiving the support request from the support request transferor of the server, and terminates the fourth connection after the information of the support game element is transmitted, wherein the supporting terminal is different than the receiving terminal, and the supporting terminal and the receiving terminal each belong to a same party in the game for jointly supporting one another during the progress of the game.

11. The game system according to claim 10,
wherein each game element includes a parameter that provides a degree of advantage in the progress of the game,
wherein the game progressor further comprises:
a parameter changer that changes the parameter of a selected game element according to the progress of the game the game is progressed using the selected game element; and
a support result transmitter that establishes a fifth connection with the server to transmit information of the game progress result to the server via the network when the game is progressed using the support game element by the receiving terminal, and terminates the fifth connection after the information of the game progress is transmitted,
wherein the server further comprises:
a server-side support result receiver that receives the information of the game progress result transmitted from the support result transmitter; and
a support result transferor that establishes a sixth connection with the supporting terminal to transfer information of the game progress result via the network to the supporting terminal that transmitted the support game element, and terminates the sixth connection after the information of the game progress result is transmitted, wherein each terminal further comprises:
a terminal-side support result receiver that receives the information of the game progress result transferred from the support result transferor, and
a support time parameter changer that changes the parameter included in the support game element stored in the game element storage according to the game progress result indicated by the information received by the terminal-side support result receiver.

12. The game system according to claim 10,
wherein the server further comprises a group storage that stores parties to which each of the multiple terminals belongs, and
wherein the support request transferor establishes the fourth connection to transfer the support request to each of the multiple terminals belonging to the same party as the receiving terminal.

13. The game system according to claim 10,
wherein the game element obtainer comprises a support time game element obtainer that obtains a new game element according to a player's instruction in response to receiving the support request transferred from the server-side support request transmitter, and
wherein the game element transmitter establishes the fourth connection to transmit information of the new game element obtained by the support time game element obtainer to the server, and terminates the fourth connection after the information of the new game element is transmitted.

14. The game system according to claim 10, wherein the support progressor progresses the game according to a quantity of game elements received by the terminal-side game element receiver.

15. The game system according to claim 10, wherein the support progressor progresses the game according to a sum of a number of the game elements received by the terminal-side game element receiver and a number of the game elements stored in the terminal-side game element storage.

16. A server apparatus intermittently connected to multiple terminals via a network for transmission and reception of information so that the server apparatus does not control whether each terminal of the multiple terminals is in a connection state, each of the multiple terminals progressing a game by causing a player character to use a game element obtained by the player character during a progress of the game, the server apparatus comprising:
a game element receiver that establishes a first connection with a supporting terminal of the multiple terminals, receives information of a game element obtained by the supporting terminal, and terminates the first connection after the information of the game element is received;
a game element storage that stores the game element identified by the information received by the game element receiver as a support game element;
a support request receiver that establishes a second connection with a receiving terminal of the multiple terminals, receives a support request transmitted from the receiving terminal, and terminates the second connection after the support request is received; and
a game element transmitter that establishes a third connection with the receiving terminal, transmits information of the support game element, stored in the game element storage, to the receiving terminal in response to the support request receiver receiving the support request from the receiving terminal, and terminates the third connection after the information of the support game element is transmitted, wherein the supporting terminal is different than the receiving terminal, and the supporting terminal and the receiving terminal each belong to a same party in the game for jointly supporting one another during the progress of the game.

17. The server apparatus according to claim 16, wherein the game comprises multiple types of game elements, wherein the support request designates one of the multiple types of game elements selected by the receiving terminal, and wherein the game element transmitter transmits the information of the support game element of the one of the multiple types designated by the support request to the receiving terminal when the support game element of the one of the multiple types designated by the support request is stored in the game element storage.

18. The server apparatus according to claim 16, wherein the game element storage stores game elements for each party formed by multiple ones of the multiple terminals.

19. A server apparatus intermittently connected to multiple terminals via a network for transmission and reception of information so that the server apparatus does not control whether each terminal of the multiple terminals is in a connection state, each of the multiple terminals progressing a game by causing a player character to use a game element obtained by the player character during a progress of the game, the server apparatus comprising:

a support request receiver that receives a support request from a receiving terminal of the multiple terminals via the network;

a support request transferor that establishes a first connection with a supporting terminal of the multiple terminals to transfer the support request received by the support request receiver to the supporting terminal in response to the support request receiver receiving the support request, and terminates the first connection after the support request is transferred;

a support game element receiver that receives information of a support game element from the supporting terminal after the support request transferor transfers the support request; and a game element transferor that establishes a second connection with the receiving terminal to transfer the information of the support game element to the receiving terminal in response to the support game element receiver receiving the information of the support game element, and terminates the second connection after the information of the support game element is transmitted, wherein the supporting terminal is different than the receiving terminal, and the supporting terminal and the receiving terminal each belong to a same party in the game for jointly supporting one another during the progress of the game.

20. The server apparatus according to claim 19, further comprising:

a group storage that stores a party to which each terminal of the multiple terminals belongs.

21. A game apparatus intermittently connected to a server via a network for transmission and reception of information so that the server does not control whether the game apparatus is in a connection state, the game apparatus comprising:

a game element obtainer that obtains at least one game element that can be used by a player character during a progress of a game;

a game element storage that stores the at least one obtained game element; and a game progressor that progresses the game using a game element selected from among the stored at least one obtained game element, the game progressor comprising:

a support request transmitter that establishes a first connection with the server to transmit a support request to the server via the network, and terminates the first connection after the support request is transmitted;

a game element receiver that receives information of a support game element from the server after the support request is transmitted to the server, the information of the support game element received via a second connection that is established by the server, the server terminating the second connection after the information of the support game element is received by the game element receiver; and a support progressor that progresses the game using the support game element identified by the information received by the game element receiver.

22. The game apparatus according to claim 21, wherein the game element receiver receives a game element newly obtained by the supporting terminal.

23. The game apparatus according to claim 21, further comprising:

an additional support request transmitter that establishes a third connection with the server to transmit an additional request via the network to the server, and terminates the third connection after the additional request is transmitted, wherein the game element receiver further receives information of an additional game element transmitted from the supporting terminal in response to the additional support request.

24. The game apparatus according to claim 21, wherein the game element includes a parameter that fixes a degree of advantage in the progress of the game, wherein the game progressor further comprises:

a parameter changer that changes the parameter included in a used game element according to the progress of the game when the game is progressed using the used game element; and a support result transmitter that establishes a third connection with the server to transmit information of the game progress result via the network to the server when the game is progressed using the support game element indicated by the information received by the game element receiver, and terminates the third connection after the information of the game progress is transmitted.

25. The game apparatus according to claim 21, wherein the support progressor progresses the game according to a quantity of game elements received by the game element receiver.

26. The game apparatus according to claim 21, wherein the support progressor progresses the game according to a sum of a number of game elements received by the game element receiver and a number game elements stored in the game element storage.

27. A server apparatus intermittently connected to multiple terminals via a network for transmission and reception of information so that the server apparatus does not control whether each terminal of the multiple terminals is in a connection state, each of the multiple terminals progressing a game by causing a player character to use a game element obtained by the player character during a progress of the game, the server apparatus comprising:
- a program memory that stores a program;
- a data memory that stores data;
- a processor that executes the program; and
- a communications device that communicates with each terminal for transmission and reception of information, wherein the program causes:
- the communications device to establish a first connection with a supporting terminal of the multiple terminals, receive information of a game element obtained in the supporting terminal, and terminate the first connection after the information of the game element is received;
- the data memory to store the obtained game element identified by the information received by the communications device as a support game element;
- the communications device to establish a second connection with a receiving terminal of the multiple terminals, receive a support request transmitted from the receiving terminal, and terminate the second connection after the support request is received; and
- the communications device to establish a third connection with the receiving terminal, transmit information of the support game element, stored in the data memory, to the receiving terminal in response to the communications device receiving the support request, and terminate the third connection after the information of the support game element is transmitted, and wherein the supporting terminal and the receiving terminal each belong to a same party in the game for jointly supporting one another during the progress of the game.

28. A server apparatus intermittently connected to multiple terminals via a network for transmission and reception of information so that the server apparatus does not control whether each terminal of the multiple terminals is in a connection state, each of the multiple terminals progressing a game by causing a player character to use a game element obtained by the player character during a progress of the game, the server apparatus comprising:
- a program memory that stores a program;
- a processor that executes the program; and
- a communications device that communicates with each terminal for transmission and reception of information, wherein the program causes:
- the communications device to receive a support request sent from a receiving terminal of the multiple terminals via the network;
- the communications device to establish a first connection with a supporting terminal of the multiple terminals to transfer the support request received by the communications device to the supporting terminal in response to the communications device receiving the support request, and terminate the first connection after the support request is transferred;
- the communications device to receive information of a support game element from the supporting terminal after the communications device transfers the support request; and
- the communications device to establish a second connection with the receiving terminal to transfer the information of the support game element to the receiving terminal in response to the communication device receiving the information of the support game element, and terminate the second connection after the information of the support game element is transmitted, wherein the supporting terminal is different the said receiving terminal, and wherein the supporting terminal and the receiving terminal each belong to a same party in the game for jointly supporting one another during the progress of the game.

29. A game apparatus intermittently connected to a server via a network for transmission and reception of information so that the server does not control whether the game apparatus is in a connection state, the game apparatus comprising:
- a program memory that stores a program;
- a processor that executes the program; and
- a communications device that communicates with the server for transmission and reception of information;

wherein the program causes:
- the processor to obtain at least one game element that can be used by a player character during a progress of a game;
- the data memory to store the at least one obtained game element;
- the processor to progress the game using a game element selected from among the at least one obtained game element stored in the data memory;
- the communications device to establish a first connection with the server to transmit a support request to the server via the network, and terminate the connection after the support request is transmitted;
- the communications device to receive information of a support game element from the server after the communications device transmits the support request to the server, the information of the support game element received via a second connection that is established by the server, the server terminating the second connection after the information of the support game element is received by the communications device; and
- the processor to progress the game using the support game element identified by the information received by the communications device.

30. A non-transitory computer-readable storage medium that stores a program executed by a server connected to multiple terminals via a network for transmission and reception of information so that the server does not control whether each terminal of the multiple terminals is in a connection state, each of the multiple terminals progressing a game by causing a player character to use a game element obtained by the player character during a progress of the game, wherein the program comprises:
- a game element receiving code segment that establishes a first connection between the server and a supporting terminal of the multiple terminals, receives, from the supporting terminal, information of a game element obtained by the supporting terminal, and terminates the first connection after the information of the game element is received;
- a game element storing code segment that stores the obtained game element identified by the information received by the game element receiving code segment in a data memory of the server as a support game element;
- a support request receiving code segment that establishes a second connection between the server and a receiving terminal of the multiple terminals, receives, from the receiving terminal, a support request transmitted from the receiving terminal, and terminates the second connection after the support request is received; and a game element transmitting code segment that establishes a third connection between the server and the receiving terminal, transmits information of the support game element, stored in the data memory, to the receiving terminal in response to the support request receiving code segment receiving the support request, and terminates the third connection after the information of the support game element is transmitted, and wherein the supporting terminal and the receiving terminal each belong to a same party in the game for jointly supporting one another during the progress of the game.

31. A non-transitory computer-readable storage medium that stores a program executed by a server connected to multiple terminals via a network for transmission and reception of information so that the server does not control whether each terminal of the multiple terminals is in a connection state, each of the multiple terminals progressing a game by causing a player character to use a game element obtained by the player character during a progress of the game, wherein the program comprises:

a support request receiving code segment that receives a support request transmitted from a receiving terminal of the multiple terminals via the network;

a support request transferring code segment that establishes a first connection with a supporting terminal of the multiple terminals to transfer the support request received by the support request receiving code segment to the supporting terminal in response to the support request receiving code segment receiving the support request, and terminates the first connection after the support request is transferred;

a game element receiving code segment that receives information of a support game element from the supporting terminal after the communications device transfers the support request; and a game element transferring code segment that establishes a second connection with the receiving terminal to transfer the information of the support game element to the receiving terminal in response to the game element receiving code segment receiving the information of the support game element, and terminates the second connection after the information of the support game element is transmitted, wherein the supporting terminal is different the said receiving terminal, and wherein the supporting terminal and the receiving terminal each belong to a same party in the game for jointly supporting one another during the progress of the game.

32. A non-transitory computer-readable storage medium that stores a program executed by a supporting terminal and a receiving terminal intermittently connected to a server via a network for transmission and reception of information so that the server does not control whether the supporting terminal and the receiving terminal are in a connection state, wherein the program comprises:

a game element obtaining code segment that obtains at least one obtained game element that can be used by a player character during a progress of a game;

a game element storing code segment that stores the at least one obtained game element in a data memory of the receiving terminal;

a first game progressing code segment that progresses the game using a game element selected from among the at least one obtained game element stored in the data memory of the receiving terminal;

a support request transmitting code segment that establishes a first connection with the server to transmit a support request from the receiving terminal to the server via the network, and terminates the connection after the support request is transmitted;

a game element receiving code segment that receives, by the receiving terminal, information of a support game element of the supporting terminal from the server after the support request transmitting code segment transmits the support request to the server, the information of the support game element received via a second connection that is established by the server, the server terminating the second connection after the information of the support game element is received by the communications device; and a second game progressing code segment that progresses the game, in the receiving terminal, using the support game element identified by the information received by the game element receiving code segment, and wherein the supporting terminal and the receiving terminal each belong to a same party in the game for jointly supporting one another during the progress of the game.

33. A server-implemented game progressing method for progressing a game by a server and multiple terminals each of which progresses the game with a player character, each terminal of the multiple terminals being intermittently connected to the server via a network for transmission and reception of information so that the server does not control whether each terminal is in a connection state, each terminal individually progressing the game and including a memory that stores an obtained game element that can be used by the player character in the game, the server-implemented method comprising:

accepting, by the server, a first connection from a supporting terminal of the multiple terminals to receive information of the obtained game element stored in the memory of the supporting terminal, the first connection being terminated after the server receives the information of the obtained game element;

storing, by the server, the received obtained game element identified by the information received from the supporting terminal in a memory of the server as a support game element;

accepting, by the server, a second connection from a receiving terminal of the multiple terminals to receive a support request from the receiving terminal, the second connection being terminated after the server receives the support request; and establishing, by the server, a third connection with the receiving terminal to transmit information of the support game element that is stored in the memory of the server to the receiving terminal in response to the server receiving the support request, the server terminating the third connection after the information of the support game element is transmitted, wherein the supporting terminal is different than the receiving terminal, wherein the game is progressed in each terminal using one of the obtained game element stored in the memory of the corresponding terminal and the support game element, and wherein the supporting terminal and the receiving terminal each belong to a same party in the game for jointly supporting one another during a progress of the game.

34. A server-implemented game progressing method for progressing a game by a server and multiple terminals each of which progresses the game with a player character, each of the multiple terminals being intermittently connected to the server via a network for transmission and reception of information so that the server does not control whether each terminal of the multiple terminals is in a connection state, each terminal individually progressing the game and including a memory that stores an obtained game element that can be used by the player character in the game, the server-implemented method comprising:

accepting, by the server, a first connection to receive a support request from a receiving terminal of the multiple terminals, the first connection being terminated after the server receives the support request;

establishing, by the server, a second connection with a supporting terminal of the multiple terminals to transfer the support request received from the receiving terminal to the supporting terminal in response to the server receiving the support request, and terminating, by the server, the second connection after the support request is transferred;

accepting, by the server, a third connection to receive information of a support game element from the supporting terminal after the support request is transferred to the supporting terminal, the third connection being terminated after the server receives the information of the support game element;

establishing, by the server, a fourth connection with the receiving terminal to transfer the information of the support game element to the receiving terminal in response to in response to the server receiving the information of the support game element, and terminating, by the server, the fourth connection after the information of the support game element is transferred, wherein the supporting terminal is different than the receiving terminal, wherein the game is progressed in each terminal using one of the obtained game element stored in the memory of the corresponding terminal and the support game element, and wherein the supporting terminal and the receiving terminal each belong to a same party in the game for jointly supporting one another during a progress of the game.

\* \* \* \* \*